(12) United States Patent
Cope et al.

(10) Patent No.: US 7,046,124 B2
(45) Date of Patent: *May 16, 2006

(54) POWER LINE COUPLING DEVICE AND METHOD OF USING THE SAME

(75) Inventors: Leonard D. Cope, Jefferson, MD (US); William O. Radtke, Ellicott City, MD (US); James D. Mollenkopf, Fairfax, VA (US)

(73) Assignee: Current Technologies, LLC, Germantown, MD (US)

( * ) Notice: Subject to any disclaimer, the term of this patent is extended or adjusted under 35 U.S.C. 154(b) by 201 days.

This patent is subject to a terminal disclaimer.

(21) Appl. No.: 10/348,164

(22) Filed: Jan. 21, 2003

(65) Prior Publication Data

US 2004/0142599 A1    Jul. 22, 2004

(51) Int. Cl.
H04M 11/04    (2006.01)

(52) U.S. Cl. .......................... 340/310.01; 340/310.02; 340/310.03; 340/310.04; 340/310.05; 340/310.06; 340/310.07

(58) Field of Classification Search ............. 340/310.01–310.07; 375/257, 258, 259; 333/24 R, 333/101, 100, 131; 174/36
See application file for complete search history.

(56) References Cited

U.S. PATENT DOCUMENTS

| | | | |
|---|---|---|---|
| 1,547,242 A | 7/1925 | Strieby | 340/310.03 |
| 2,298,435 A | 10/1942 | Tunick | 250/15 |
| 2,577,731 A | 12/1951 | Berger | 370/293 |
| 3,369,078 A | 2/1968 | Stradley | 381/2 |
| 3,445,814 A | 5/1969 | Spalti | 340/151 |
| 3,605,009 A | 9/1971 | Enge | 323/93 |
| 3,641,536 A | 2/1972 | Prosprich | 340/870.15 |
| 3,656,112 A | 4/1972 | Paull | 340/151 |
| 3,696,383 A | 10/1972 | Oishi et al. | 340/310 |
| 3,701,057 A * | 10/1972 | Hoer | 333/112 |
| 3,702,460 A | 11/1972 | Blose | 340/150 |
| 3,810,096 A | 5/1974 | Kabat et al. | 340/147 R |
| 3,846,638 A | 11/1974 | Wetherell | 307/3 |
| 3,895,370 A | 7/1975 | Valentini | 340/310 |
| 3,900,842 A | 8/1975 | Calabro et al. | 340/310.03 |
| 3,911,415 A | 10/1975 | Whyte | 340/310 |
| 3,942,168 A | 3/1976 | Whyte | 340/310.01 |

(Continued)

FOREIGN PATENT DOCUMENTS

DE    197 28 270 A1    1/1999

(Continued)

OTHER PUBLICATIONS

Leonard David Cope Patent Application Publication US 2004/0003934 Power line coupling device and method of using the same, filed on Nov. 12, 2002.*

(Continued)

Primary Examiner—Hung Nguyen
(74) Attorney, Agent, or Firm—Manelli Denison & Selter PLLC; Mel Barnes

(57) ABSTRACT

The coupler of the present invention couples broadband RF signals to and from a power line conductor. The coupler of one embodiment that is for use with overhead power lines includes a length of URD MV cable with the neutral conductor removed and that is communicatively coupled to a MV power line at each end on opposite sides of a low pass filter. A radio frequency choke is communicatively coupled to URD MV cable between first and second coupling capacitors. The semi-conductive jacket of the URD cable may be coupled to ground via a low frequency conductive path.

25 Claims, 8 Drawing Sheets

U.S. PATENT DOCUMENTS

| | | | |
|---|---|---|---|
| 3,942,170 A | 3/1976 | Whyte | 340/310 |
| 3,962,547 A | 6/1976 | Pattantyus-Abraham | 179/2.5 R |
| 3,964,048 A | 6/1976 | Lusk et al. | 340/310 R |
| 3,967,264 A | 6/1976 | Whyte et al. | 340/310.08 |
| 3,973,240 A | 8/1976 | Fong | 340/151 |
| 4,004,110 A | 1/1977 | Whyte | 179/170 J |
| 4,004,257 A | 1/1977 | Geissler | 333/207 |
| 4,012,733 A | 3/1977 | Whyte | 340/310 |
| 4,016,429 A | 4/1977 | Vercellotti et al. | 307/149 |
| 4,017,845 A | 4/1977 | Kilian et al. | 340/310.02 |
| 4,053,876 A | 10/1977 | Taylor | 340/529 |
| 4,057,793 A | 11/1977 | Johnson et al. | 340/310 R |
| 4,060,735 A | 11/1977 | Pascucci et al. | 307/3 |
| 4,070,572 A | 1/1978 | Summerhayes | 250/199 |
| 4,119,948 A | 10/1978 | Ward et al. | 340/870.02 |
| 4,142,178 A | 2/1979 | Whyte et al. | 340/310 |
| 4,188,619 A | 2/1980 | Perkins | 340/310 R |
| 4,239,940 A | 12/1980 | Dorfman | 179/2.51 |
| 4,250,489 A | 2/1981 | Dudash et al. | 340/147 T |
| 4,254,402 A | 3/1981 | Perkins | 340/310 R |
| 4,263,549 A | 4/1981 | Toppeto | 324/127 |
| 4,268,818 A | 5/1981 | Davis et al. | 340/310.38 |
| 4,323,882 A | 4/1982 | Gajjar | 340/310 R |
| 4,357,598 A | 11/1982 | Melvin, Jr. | 340/310 A |
| 4,359,644 A | 11/1982 | Foord | 307/40 |
| 4,367,522 A | 1/1983 | Forstbauer et al. | 363/137 |
| 4,383,243 A | 5/1983 | Krügel et al. | 340/310.02 |
| 4,386,436 A | 5/1983 | Kocher et al. | 455/151.4 |
| 4,408,186 A | 10/1983 | Howell | 340/310 A |
| 4,409,542 A | 10/1983 | Becker et al. | 324/548 |
| 4,413,250 A | 11/1983 | Porter et al. | 340/310.01 |
| 4,419,621 A | 12/1983 | Becker et al. | 324/548 |
| 4,433,284 A | 2/1984 | Perkins | 323/361 |
| 4,442,492 A | 4/1984 | Karlsson et al. | 364/464 |
| 4,457,014 A | 6/1984 | Bloy | 381/98 |
| 4,468,792 A | 8/1984 | Baker et al. | 375/45 |
| 4,471,399 A | 9/1984 | Udren | 361/64 |
| 4,473,816 A | 9/1984 | Perkins | 340/310 |
| 4,473,817 A | 9/1984 | Perkins | 340/310 |
| 4,475,209 A | 10/1984 | Udren | 375/214 |
| 4,479,033 A | 10/1984 | Brown et al. | 455/402 |
| 4,481,501 A | 11/1984 | Perkins | 340/310 |
| 4,495,386 A | 1/1985 | Brown et al. | 455/402 |
| 4,504,705 A | 3/1985 | Pilloud | 381/77 |
| 4,517,548 A | 5/1985 | Ise et al. | 340/310.06 |
| 4,569,045 A | 2/1986 | Schieble et al. | 370/85 |
| 4,636,771 A | 1/1987 | Ochs | 340/310.05 |
| 4,638,298 A | 1/1987 | Spiro | 370/392 |
| 4,642,607 A | 2/1987 | Strom et al. | 340/310 |
| 4,644,321 A | 2/1987 | Kennon | 340/310 A |
| 4,652,855 A | 3/1987 | Weikel | 340/310 |
| 4,668,934 A | 5/1987 | Shuey | 340/310.06 |
| 4,675,648 A | 6/1987 | Roth et al. | 340/310.07 |
| 4,683,450 A | 7/1987 | Max et al. | 333/202 |
| 4,686,382 A | 8/1987 | Shuey | 307/149 |
| 4,686,611 A | 8/1987 | Evans | 364/580 |
| 4,697,166 A | 9/1987 | Warnagiris et al. | 340/310 R |
| 4,701,945 A | 10/1987 | Pedigo | 455/402 |
| 4,724,381 A | 2/1988 | Crimmins | 324/127 |
| 4,745,391 A | 5/1988 | Gajjar | 340/310 A |
| 4,746,897 A | 5/1988 | Shuey | 340/310 R |
| 4,749,992 A | 6/1988 | Fitzemeyer et al. | 340/870.02 |
| 4,766,414 A | 8/1988 | Shuey | 340/310 A |
| 4,772,870 A | 9/1988 | Reyes | 340/310 R |
| 4,785,195 A | 11/1988 | Rochelle et al. | 307/18 |
| 4,800,363 A | 1/1989 | Braun et al. | 340/310 A |
| 4,815,106 A | 3/1989 | Propp et al. | 375/257 |
| 4,835,517 A | 5/1989 | van der Gracht et al. | 340/310 A |
| 4,890,089 A | 12/1989 | Shuey | 340/310.07 |
| 4,903,006 A | 2/1990 | Boomgaard | 340/310 A |
| 4,904,996 A | 2/1990 | Fernandes | 340/870.07 |
| 4,962,496 A | 10/1990 | Vercellotti et al. | 370/204 |
| 4,973,940 A | 11/1990 | Sakai et al. | 340/310 R |
| 4,979,183 A | 12/1990 | Cowart | 375/142 |
| 5,006,846 A | 4/1991 | Granville et al. | 340/870.28 |
| 5,066,939 A | 11/1991 | Mansfield, Jr. | 340/310 R |
| 5,068,890 A | 11/1991 | Nilssen | 379/90 |
| 5,132,992 A | 7/1992 | Yurt et al. | 375/240 |
| 5,148,144 A | 9/1992 | Sutterlin et al. | 340/310 A |
| 5,151,838 A | 9/1992 | Dockery | 340/310 R |
| 5,185,591 A | 2/1993 | Shuey | 340/310 A |
| 5,191,467 A | 3/1993 | Kapany et al. | 359/341 |
| 5,210,519 A | 5/1993 | Moore | 340/310 |
| 5,257,006 A | 10/1993 | Graham et al. | 340/310 A |
| 5,264,823 A | 11/1993 | Stevens | 340/310.04 |
| 5,272,462 A | 12/1993 | Teyssandier et al. | 340/310.01 |
| 5,301,208 A | 4/1994 | Rhodes | 375/36 |
| 5,319,634 A | 6/1994 | Bartholomew et al. | 370/18 |
| 5,341,265 A | 8/1994 | Westrom et al. | 361/44 |
| 5,351,272 A | 9/1994 | Abraham | 375/38 |
| 5,355,109 A | 10/1994 | Yamazaki | 336/92 |
| 5,359,625 A | 10/1994 | Vander Mey et al. | 375/1 |
| 5,369,356 A | 11/1994 | Kinney et al. | 324/142 |
| 5,375,141 A | 12/1994 | Takahashi | 375/1 |
| 5,406,249 A | 4/1995 | Pettus | 340/310.06 |
| 5,410,720 A | 4/1995 | Osterman | 725/150 |
| 5,426,360 A | 6/1995 | Maraio et al. | 324/126 |
| 5,432,841 A | 7/1995 | Rimer | 455/457 |
| 5,448,229 A | 9/1995 | Lee, Jr. | 340/870.02 |
| 5,461,629 A | 10/1995 | Sutterlin et al. | 371/30 |
| 5,477,091 A | 12/1995 | Fiorina et al. | 307/66 |
| 5,481,249 A | 1/1996 | Sato | 340/2.1 |
| 5,485,040 A | 1/1996 | Sutterlin | 307/3 |
| 5,497,142 A | 3/1996 | Chaffanjon | 340/310.06 |
| 5,498,956 A | 3/1996 | Kinney et al. | 324/142 |
| 5,533,054 A | 7/1996 | DeAndrea et al. | 375/286 |
| 5,537,087 A | 7/1996 | Naito | 336/92 |
| 5,559,377 A | 9/1996 | Abraham | 307/104 |
| 5,568,185 A | 10/1996 | Yoshikazu | 348/22 |
| 5,579,221 A | 11/1996 | Mun | 364/188 |
| 5,579,335 A | 11/1996 | Sutterlin et al. | 375/200 |
| 5,592,354 A | 1/1997 | Nocentino, Jr. | 361/69 |
| 5,592,482 A | 1/1997 | Abraham | 348/8 |
| 5,598,406 A | 1/1997 | Albrecht et al. | 370/296 |
| 5,616,969 A | 4/1997 | Morava | 307/91 |
| 5,625,863 A | 4/1997 | Abraham | 455/3.3 |
| 5,630,204 A | 5/1997 | Hylton et al. | 455/3.3 |
| 5,640,416 A | 6/1997 | Chalmers | 375/147 |
| 5,664,002 A | 9/1997 | Skinner, Sr. | 379/56.2 |
| 5,684,450 A | 11/1997 | Brown | 340/310.02 |
| 5,691,691 A | 11/1997 | Merwin et al. | 340/310.02 |
| 5,694,108 A | 12/1997 | Shuey | 340/310.01 |
| 5,705,974 A | 1/1998 | Patel et al. | 340/310.08 |
| 5,712,614 A | 1/1998 | Patel et al. | 340/310.03 |
| 5,717,685 A | 2/1998 | Abraham | 370/30 |
| 5,726,980 A | 3/1998 | Rickard | 370/293 |
| 5,748,104 A | 5/1998 | Argyroudis et al. | 340/870.11 |
| 5,748,671 A | 5/1998 | Sutterlin et al. | 375/206 |
| 5,751,803 A | 5/1998 | Shpater | 379/379 |
| 5,770,996 A | 6/1998 | Severson et al. | 340/310.08 |
| 5,774,526 A | 6/1998 | Propp et al. | 379/90.1 |
| 5,777,544 A | 7/1998 | Vander Mey et al. | 340/310.06 |
| 5,777,545 A | 7/1998 | Patel et al. | 341/310.06 |
| 5,777,769 A | 7/1998 | Coutinho | 359/173 |
| 5,778,116 A | 7/1998 | Tomich | 385/16 |
| 5,796,607 A | 8/1998 | Le Van Suu | 364/140.01 |
| 5,798,913 A | 8/1998 | Tiesinga et al. | 363/21.13 |
| 5,801,643 A | 9/1998 | Williams et al. | 340/870.02 |
| 5,802,102 A | 9/1998 | Davidovici | 375/152 |
| 5,805,053 A | 9/1998 | Patel et al. | 340/310.01 |
| 5,805,458 A | 9/1998 | McNamara et al. | 702/60 |
| 5,818,127 A | 10/1998 | Abraham | 307/106 |
| 5,818,821 A | 10/1998 | Schurig | 370/293 |

| Patent No. | Kind | Date | Inventor | Class |
|---|---|---|---|---|
| 5,828,293 | A | 10/1998 | Rickard | 340/310.04 |
| 5,835,005 | A | 11/1998 | Furukawa et al. | 340/310.01 |
| 5,847,447 | A | 12/1998 | Rozin et al. | 257/678 |
| 5,850,114 | A * | 12/1998 | Froidevaux | 307/105 |
| 5,856,776 | A | 1/1999 | Armstrong et al. | 340/310.01 |
| 5,864,284 | A | 1/1999 | Sanderson | 340/310.01 |
| 5,870,016 | A | 2/1999 | Shresthe | 340/310.01 |
| 5,880,677 | A | 3/1999 | Lestician | 340/825.06 |
| 5,881,098 | A | 3/1999 | Tzou | 375/152 |
| 5,892,430 | A | 4/1999 | Wiesman et al. | 340/310.01 |
| 5,892,758 | A | 4/1999 | Argyroudis | 370/335 |
| 5,929,750 | A | 7/1999 | Brown | 340/310.02 |
| 5,933,071 | A | 8/1999 | Brown | 340/310.01 |
| 5,933,073 | A | 8/1999 | Shuey | 340/310.07 |
| 5,937,003 | A | 8/1999 | Sutterlin et al. | 375/208 |
| 5,937,342 | A | 8/1999 | Kline | 455/402 |
| 5,949,327 | A | 9/1999 | Brown | 340/310.01 |
| 5,963,585 | A | 10/1999 | Omura et al. | 375/207 |
| 5,977,650 | A | 11/1999 | Rickard et al. | 307/3 |
| 5,978,371 | A | 11/1999 | Mason, Jr. et al. | 370/389 |
| 5,982,276 | A | 11/1999 | Stewart | 340/310.01 |
| 5,994,998 | A | 11/1999 | Fisher et al. | 340/310.01 |
| 5,994,999 | A | 11/1999 | Ebersohl | 340/310.01 |
| 6,014,386 | A | 1/2000 | Abraham | 370/485 |
| 6,023,106 | A | 2/2000 | Abraham | 307/3 |
| 6,037,678 | A | 3/2000 | Rickard | 307/89 |
| 6,037,857 | A | 3/2000 | Behrens et al. | 340/310.03 |
| 6,040,759 | A | 3/2000 | Sanderson | 340/310.01 |
| 6,091,932 | A | 7/2000 | Langlais | 455/5.1 |
| 6,104,707 | A | 8/2000 | Abraham | 370/295 |
| 6,121,765 | A | 9/2000 | Carlson | 323/359 |
| 6,130,896 | A | 10/2000 | Lueker et al. | 370/469 |
| 6,140,911 | A | 10/2000 | Fisher et al. | 340/310.01 |
| 6,141,634 | A | 10/2000 | Flint et al. | 703/18 |
| 6,144,292 | A | 11/2000 | Brown | 340/310.02 |
| 6,151,330 | A | 11/2000 | Liberman | 370/449 |
| 6,151,480 | A | 11/2000 | Fischer et al. | 340/310.01 |
| 6,154,488 | A | 11/2000 | Hunt | 375/219 |
| 6,157,292 | A | 12/2000 | Piercy et al. | 340/310.01 |
| 6,172,597 | B1 | 1/2001 | Brown | 340/310.02 |
| 6,175,860 | B1 | 1/2001 | Gaucher | 709/208 |
| 6,177,849 | B1 | 1/2001 | Barsellotti et al. | 333/177 |
| 6,212,658 | B1 | 4/2001 | Le Van Suu | 714/749 |
| 6,226,166 | B1 | 5/2001 | Gumley et al. | 361/118 |
| 6,229,434 | B1 | 5/2001 | Knapp et al. | 340/310.01 |
| 6,239,722 | B1 | 5/2001 | Colton et al. | 340/870.02 |
| 6,243,413 | B1 | 6/2001 | Beukema | 375/222 |
| 6,243,571 | B1 | 6/2001 | Bullock et al. | 455/402 |
| 6,255,805 | B1 | 7/2001 | Papalia et al. | 323/207 |
| 6,255,935 | B1 | 7/2001 | Lehmann et al. | 340/310.07 |
| 6,275,144 | B1 | 8/2001 | Rumbaugh | 340/310.01 |
| 6,282,405 | B1 | 8/2001 | Brown | 725/79 |
| 6,297,729 | B1 | 10/2001 | Abali et al. | 340/310.01 |
| 6,297,730 | B1 | 10/2001 | Dickinson | 340/310.01 |
| 6,300,881 | B1 | 10/2001 | Yee et al. | 340/870.02 |
| 6,313,738 | B1 | 11/2001 | Wynn | 340/310.03 |
| 6,317,031 | B1 | 11/2001 | Rickard | 340/310.03 |
| 6,331,814 | B1 | 12/2001 | Albano et al. | 340/310.01 |
| 6,335,672 | B1 | 1/2002 | Tumlin et al. | 336/175 |
| 6,373,376 | B1 | 4/2002 | Adams et al. | 340/310.01 |
| 6,384,580 | B1 | 5/2002 | Ochoa et al. | 323/207 |
| 6,396,391 | B1 | 5/2002 | Binder | 340/310.01 |
| 6,396,392 | B1 | 5/2002 | Abraham | 340/310.01 |
| 6,404,773 | B1 | 6/2002 | Williams et al. | 370/463 |
| 6,407,987 | B1 | 6/2002 | Abraham | 370/295 |
| 6,414,578 | B1 | 7/2002 | Jitaru | 336/170 |
| 6,417,762 | B1 | 7/2002 | Comer | 340/310.01 |
| 6,425,852 | B1 | 7/2002 | Epstein et al. | 600/13 |
| 6,441,723 | B1 | 8/2002 | Mansfield, Jr. et al. | 340/310.01 |
| 6,449,318 | B1 | 9/2002 | Rumbaugh | 375/309 |
| 6,452,482 | B1 | 9/2002 | Cern | 340/310.01 |
| 6,480,510 | B1 | 11/2002 | Binder | 370/502 |
| 6,486,747 | B1 | 11/2002 | DeCramer et al. | 333/25 |
| 6,492,897 | B1 | 12/2002 | Mowery, Jr. | 340/310.01 |
| 6,496,104 | B1 | 12/2002 | Kline | 340/310.01 |
| 6,504,357 | B1 | 1/2003 | Hemminger et al. | 340/310.01 |
| 6,507,573 | B1 | 1/2003 | Brandt et al. | 370/335 |
| 6,515,485 | B1 | 2/2003 | Bullock et al. | 324/601 |
| 6,522,626 | B1 | 2/2003 | Greenwood | 370/208 |
| 6,522,650 | B1 | 2/2003 | Yonge, III et al. | 370/390 |
| 6,549,120 | B1 | 4/2003 | De Buda | 340/310.01 |
| 6,577,231 | B1 | 6/2003 | Litwin, Jr. et al. | 340/310.01 |
| 6,590,493 | B1 | 7/2003 | Rasimas et al. | 340/310.01 |
| 6,611,134 | B1 | 8/2003 | Chung | 324/74 |
| 6,624,532 | B1 | 9/2003 | Davidow et al. | 307/39 |
| 6,624,745 | B1 | 9/2003 | Willer | |
| 6,646,447 | B1 | 11/2003 | Cern et al. | 324/539 |
| 6,650,249 | B1 | 11/2003 | Meyer et al. | 340/870.02 |
| 6,667,685 | B1 | 12/2003 | Wasaki et al. | 340/310.03 |
| 6,668,058 | B1 | 12/2003 | Grimes | 379/322 |
| 6,683,531 | B1 | 1/2004 | Diamanti et al. | 340/310.01 |
| 6,686,832 | B1 | 2/2004 | Abraham | 340/310.01 |
| 6,696,925 | B1 | 2/2004 | Aiello, Jr. | 340/310.01 |
| 6,753,742 | B1 | 6/2004 | Kim et al. | 333/24 R |
| 6,785,532 | B1 | 8/2004 | Rickard | 455/402 |
| 6,785,592 | B1 | 8/2004 | Smith et al. | 700/291 |
| 6,788,745 | B1 | 9/2004 | Lim et al. | 375/297 |
| 6,809,633 | B1 | 10/2004 | Cern | 340/310.07 |
| 6,844,809 | B1 | 1/2005 | Manis et al. | 340/310.02 |
| 6,844,810 | B1 | 1/2005 | Cern | 340/310.07 |
| 6,854,059 | B1 | 2/2005 | Gardner | 380/277 |
| 6,933,835 | B1 | 8/2005 | Kline | |
| 6,950,567 | B1 | 9/2005 | Kline | |
| 6,958,680 | B1 | 10/2005 | Kline | |
| 6,965,302 | B1 | 11/2005 | Mollenkopf et al. | |
| 6,965,303 | B1 | 11/2005 | Mollenkopf | |
| 2001/0038329 | A1 | 11/2001 | Diamanti et al. | 340/310.01 |
| 2001/0038343 | A1 | 11/2001 | Meyer et al. | 340/870.02 |
| 2001/0045888 | A1 | 11/2001 | Kline | 340/310.01 |
| 2001/0052843 | A1 | 12/2001 | Wiesman et al. | 340/310.01 |
| 2001/0054953 | A1 | 12/2001 | Kline | 340/310.01 |
| 2002/0002040 | A1 | 1/2002 | Kline et al. | 455/402 |
| 2002/0010870 | A1 | 1/2002 | Gardner | 713/300 |
| 2002/0014884 | A1 | 2/2002 | Chung | 324/74 |
| 2002/0027496 | A1 | 3/2002 | Cern | 340/310.01 |
| 2002/0041228 | A1 | 4/2002 | Zhang | 340/310.01 |
| 2002/0048368 | A1 | 4/2002 | Gardner | 380/277 |
| 2002/0060624 | A1 | 5/2002 | Zhang | 340/310.01 |
| 2002/0071452 | A1 | 6/2002 | Abraham | 370/480 |
| 2002/0080010 | A1 | 6/2002 | Zhang | 340/310.06 |
| 2002/0095662 | A1 | 7/2002 | Ashlock et al. | 717/136 |
| 2002/0097953 | A1 | 7/2002 | Kline | 385/24 |
| 2002/0098867 | A1 | 7/2002 | Meiksen et al. | 455/560 |
| 2002/0098868 | A1 | 7/2002 | Meiksen et al. | 455/560 |
| 2002/0105413 | A1 | 8/2002 | Cern | 340/310.01 |
| 2002/0109585 | A1 | 8/2002 | Sanderson | |
| 2002/0110310 | A1 | 8/2002 | Kline | 385/15 |
| 2002/0110311 | A1 | 8/2002 | Kline | 385/15 |
| 2002/0118101 | A1 | 8/2002 | Kline | 340/310.01 |
| 2002/0121963 | A1 | 9/2002 | Kline | 340/310.01 |
| 2002/0140547 | A1 | 10/2002 | Litwin , Jr. et al. | 340/310.01 |
| 2002/0154000 | A1 | 10/2002 | Kline | 340/310.01 |
| 2002/0171535 | A1 | 11/2002 | Cern | 340/310.07 |
| 2003/0007570 | A1 | 1/2003 | Kim et al. | 375/303 |
| 2003/0007576 | A1 | 1/2003 | Alavi et al. | 375/329 |
| 2003/0062990 | A1 | 4/2003 | Schaeffer, Jr. et al. | 340/310.01 |
| 2003/0067910 | A1 | 4/2003 | Razazian et al. | 370/352 |
| 2003/0090368 | A1 | 5/2003 | Ide | 340/310.06 |
| 2003/0103307 | A1 | 6/2003 | Dostert | 361/113 |
| 2003/0107477 | A1 | 6/2003 | Ide | 340/310.01 |
| 2003/0129978 | A1 | 7/2003 | Akiyama et al. | 455/426.1 |
| 2003/0149784 | A1 | 8/2003 | Ide | 709/231 |
| 2003/0160684 | A1 | 8/2003 | Cern | 340/310.01 |
| 2003/0169155 | A1 | 9/2003 | Mollenkopf et al. | 310/310.01 |
| 2003/0179080 | A1 | 9/2003 | Mollenkopf et al. | 340/310.01 |

| | | | |
|---|---|---|---|
| 2003/0184433 A1 | 10/2003 | Zalitzky et al. ........ 340/310.06 |
| 2003/0201759 A1 | 10/2003 | Cern |
| 2003/0201873 A1 | 10/2003 | Cern |
| 2003/0210135 A1 | 11/2003 | Cern |
| 2003/0210734 A1 | 11/2003 | Kaku .......................... 375/148 |
| 2003/0222747 A1 | 12/2003 | Perkinson et al. .......... 336/178 |
| 2003/0222748 A1 | 12/2003 | Cern et al. |
| 2003/0227373 A1 | 12/2003 | Lou et al. ............... 340/310.01 |
| 2003/0232599 A1 | 12/2003 | Dostert ....................... 455/66.1 |
| 2003/0234713 A1 | 12/2003 | Pridmore, Jr. et al. ........ 336/82 |
| 2004/0001438 A1 | 1/2004 | Aretz ........................... 370/232 |
| 2004/0001499 A1 | 1/2004 | Patella et al. ............... 370/412 |
| 2004/0003934 A1 | 1/2004 | Cope ............................. 174/36 |
| 2004/0032320 A1 | 2/2004 | Zalitzky et al. |
| 2004/0037317 A1 | 2/2004 | Zalitzky et al. ............. 370/466 |
| 2004/0054425 A1 | 3/2004 | Elmore ............................. 700/1 |
| 2004/0056734 A1 | 3/2004 | Davidow |
| 2004/0064782 A1 | 4/2004 | Lerner et al. ................ 714/800 |
| 2004/0067745 A1 | 4/2004 | Belsak ........................ 455/402 |
| 2004/0070912 A1 | 4/2004 | Kopp ........................... 361/119 |
| 2004/0083066 A1 | 4/2004 | Hayes et al. ................... 702/62 |
| 2004/0090284 A1 | 5/2004 | Cern |
| 2004/0104798 A1 | 6/2004 | Cern |
| 2004/0110483 A1 | 6/2004 | Mollenkopf |
| 2004/0113756 A1 | 6/2004 | Mollenkopf |
| 2004/0113757 A1 | 6/2004 | White, II et al. |
| 2004/0135676 A1 | 7/2004 | Berkman et al. |
| 2004/0142599 A1 | 7/2004 | Cope et al. |
| 2004/0174851 A1 | 9/2004 | Zalitzky et al. ............. 370/338 |
| 2004/0183619 A1 | 9/2004 | Sugg |
| 2004/0196144 A1 | 10/2004 | Crenshaw et al. |
| 2004/0223617 A1 | 11/2004 | Corcoran et al. |
| 2004/0227621 A1 | 11/2004 | Cope et al. ............ 340/310.01 |
| 2004/0227622 A1 | 11/2004 | Giannini et al. |
| 2005/0046550 A1 | 3/2005 | Crenshaw et al. |
| 2005/0077868 A1 | 4/2005 | Cern |
| 2005/0164666 A1 | 7/2005 | Lang et al. |

FOREIGN PATENT DOCUMENTS

| | | |
|---|---|---|
| DE | 100 08 602 A1 | 6/2001 |
| DE | 100 12 235 C2 | 12/2001 |
| DE | 100 47 648 A1 | 4/2002 |
| DE | 100 61 584 A1 | 6/2002 |
| DE | 100 61 586 A1 | 6/2002 |
| DE | 101 00 181 A1 | 7/2002 |
| DE | 101 03 530 A1 | 8/2002 |
| DE | 100 59 564 A1 | 9/2002 |
| DE | 100 48 348 C2 | 11/2002 |
| DE | 101 190 039 A1 | 12/2002 |
| DE | 101 190 040 A1 | 12/2002 |
| DE | 100 26 930 C2 | 1/2003 |
| DE | 100 26 931 C2 | 1/2003 |
| DE | 100 42 958 C2 | 1/2003 |
| DE | 101 47 918 A1 | 4/2003 |
| DE | 101 47 916 C1 | 5/2003 |
| DE | 101 46 982 C1 | 6/2003 |
| DE | 101 47 915 C1 | 6/2003 |
| DE | 101 47 913 C2 | 7/2003 |
| EP | 0 141 673 A2 | 5/1985 |
| EP | 0 581 351 A1 | 2/1994 |
| EP | 0 632 602 A2 | 1/1995 |
| EP | 0 470 185 B1 | 11/1995 |
| EP | 0 822 721 A2 | 2/1998 |
| EP | 0 913 955 A2 | 5/1999 |
| EP | 0 933 883 A2 | 8/1999 |
| EP | 0 948 143 A2 | 10/1999 |
| EP | 0 959 569 A1 | 11/1999 |
| EP | 1 011 235 A2 | 6/2000 |
| EP | 1 014 640 A2 | 6/2000 |
| EP | 1 043 866 A2 | 10/2000 |
| EP | 1 043 866 A3 | 11/2000 |
| EP | 1 075 091 A1 | 2/2001 |
| EP | 0 916 194 B1 | 9/2001 |
| EP | 1 011 235 A3 | 5/2002 |
| EP | 1 213 849 A1 | 6/2002 |
| EP | 1 217 760 A1 | 6/2002 |
| EP | 1 014 640 A3 | 7/2002 |
| EP | 1 021 866 B1 | 10/2002 |
| EP | 1 251 646 A2 | 10/2002 |
| EP | 1 253 699 A2 | 10/2002 |
| ES | 2 122 920 A1 | 12/1998 |
| FR | 2 326 087 | 7/1976 |
| GB | 1 548 652 | 7/1979 |
| GB | 2 101 857 A | 1/1983 |
| GB | 2 293 950 A | 4/1996 |
| GB | 2 315 937 A | 2/1998 |
| GB | 2 331 683 A | 5/1999 |
| GB | 2 335 335 A | 9/1999 |
| GB | 2 341 776 A | 3/2000 |
| GB | 2 342 264 A | 4/2000 |
| GB | 2 347 601 A | 9/2000 |
| JP | 1276933 | 11/1989 |
| NZ | 276741 | 7/1998 |
| WO | 84/01481 A1 | 4/1984 |
| WO | 90/13950 A2 | 11/1990 |
| WO | 92/16920 A1 | 10/1992 |
| WO | 93/07693 A1 | 4/1993 |
| WO | 95/29536 A1 | 11/1995 |
| WO | 98/01905 A1 | 1/1998 |
| WO | 98/33258 A2 | 7/1998 |
| WO | 98/33258 A3 | 7/1998 |
| WO | 98/40980 A1 | 9/1998 |
| WO | 99/59261 A1 | 11/1999 |
| WO | 00/16496 A2 | 3/2000 |
| WO | 00/59076 A1 | 10/2000 |
| WO | 00/60701 A1 | 10/2000 |
| WO | 00/60822 A1 | 10/2000 |
| WO | 01/08321 A1 | 2/2001 |
| WO | 01/43305 A1 | 6/2001 |
| WO | 01/50625 A2 | 7/2001 |
| WO | 01/50628 A1 | 7/2001 |
| WO | 01/50629 A1 | 7/2001 |
| WO | 01/63787 A1 | 8/2001 |
| WO | 01/82497 A1 | 11/2001 |
| WO | 02/17509 A1 | 2/2002 |
| WO | 02/37712 A1 | 5/2002 |
| WO | 02/054605 A1 | 7/2002 |
| WO | 02/065684 A2 | 8/2002 |
| WO | 02/089352 A1 | 11/2002 |
| WO | 02/089353 A1 | 11/2002 |
| WO | 03/009083 A2 | 1/2003 |
| WO | 03/010896 A1 | 2/2003 |
| WO | 03/30396 A2 | 4/2003 |
| WO | 03/034608 A2 | 4/2003 |
| WO | 03/039022 A1 | 5/2003 |
| WO | 03/040732 A2 | 5/2003 |
| WO | 03/056715 A1 | 7/2003 |
| WO | 2004/008656 A1 | 1/2004 |
| WO | 2004/021600 A1 | 3/2004 |

OTHER PUBLICATIONS

U.S. Appl. No. 09/765,910, filed Jan. 19, 2001, Kline.
U.S. Appl. No. 09/805,638, filed Mar. 14, 2001, Kline.
U.S. Appl. No. 09/835,532, filed Apr. 16, 2001, Kline.
U.S. Appl. No. 09/837,972, filed Apr. 19, 2001, Kline et al.
U.S. Appl. No. 09/912,633, filed Jul. 25, 2001, Kline.
U.S. Appl. No. 09/915,459, filed Jul. 26, 2001, Kline.
U.S. Appl. No. 09/924,730, filed Aug. 8, 2001, Kline.
U.S. Appl. No. 10/016,998, filed Dec. 14, 2001, Kline.
U.S. Appl. No. 10/036,914, filed Dec. 21, 2001, Mollenkopf et al.
U.S. Appl. No. 10/075,708, filed Feb. 14, 2002, Kline.
U.S. Appl. No. 10/075,332, filed Feb. 14, 2002, Kline.

U.S. Appl. No. 10/150,694, filed May 16, 2002, Gidge.
U.S. Appl. No. 10/165,992, filed Jun. 10, 2002, Kline.
U.S. Appl. No. 10/176,500, filed Jun. 21, 2002, Pridmore, Jr. et al.
U.S. Appl. No. 10/293,799, filed Nov. 13, 2002 Huebner.
U.S. Appl. No. 10/292,745, filed Nov. 12, 2002, Cope et al.
U.S. Appl. No. 10/292,714, filed Nov. 12, 2002, Cope.
U.S. Appl. No. 10/315,725, filed Dec. 10, 2002, Cope et al.
U.S. Appl. No. 10/319,317, filed Dec. 13, 2002, Mollenkopf et al.
U.S. Appl. No. 10/385,899, filed Mar. 10, 2003, Mollenkopf.
U.S. Appl. No. 10/436,778, filed May 13, 2003, Giannini et al.
U.S. Appl. No. 10/434,024, filed May 8, 2003, Corcoran et al.
Patent Abstracts of Japan, Japanese Publication No. 10200544 A2, published Jul. 31, 1998, (Matsushita Electric Works, LTD).
Tohoku Electric Power, Co., Inc., "Tohoku Electric Develops High-Speed Communications System Using Power Distribution Lines," *Tohoku Currents*, Spring 1998, 8(1), 2 pages (http://www.tohoku-epco.co.jp/profil/kurozu/c_vol8_1/art04.htm).
Power Line Communications Conference entitled, "PLC, A New Competitor in Broadband Internet Access," Dec. 11-12, 2001, Washington, D.C., 60 pages.
Rivkin, S. R., "Co-Evolution of Electric & Telecommunications Networks," *The Electricity Journal*, May 1998, 71-76.
Marketing Assessment Presentation entitled "Powerline Telecommunications," The Shpigler Group for CITI PLT, Jul. 16, 2002, 9 pages.
Campbell, C., presentation entitled "Building a Business Case for PLC: Lessons Learned From the Communication Industry Trenches," KPMG Consulting, Jul. 16, 2002, 5 pages.
"Embedded Power Line Carrier Modem," Archnet Electronic Technology, http://www.archnetco.com/english/product/ATL90.htm, 2001, 3 pages.
"Archnet: Automatic Meter Reading System Power Line Carrier Communication", www.archnetco.com/english/product/product_sl.htm, 3 pages.
"Power Line Communications Solutions", www.echelon.com/products/oem/tranceivers/powerline/default.htm, 2 pages.
"Texas Instruments: System Block Diagrams; Power Line Communication (Generic)", http://focus.ti.com/docs/apps/catalog/resources/blockdiagram.jhtml?bdId=638, 1 page.
Feduschak, N.A., "Waiting in the Wings: Is Powerline Technology Ready to Compete with Cable?", Mar. 2001, www.cabletoday.com/ic2/archives/0301/0301powerline.htm, 5 pages.
"Signalling on Low-Voltage Electrical Installations in the Frequency Band 3kHz to 148.5kHz-Part 4: Filters at the Interface of the Indoor and Outdoor Electricity Network", *CLC SC 105A (Secretariat)* May 1992, 62,1-11.
"Intellon Coporation Test Summary for Transformerless Coupler Study", *Intellon No News Wires*, Dec. 24, 1998, DOT/NHTSA Order No. DTNH22-98-P-07632, pp. 1-18.
EMETCON *Automated Distribution System*, ABB Power T & D Company, Inc., Jan. 1990, Raleigh, North Carolina, No B-919A, 14 pages.
"Dedicated Passive Backbone for Power Line Communications", *IBM Technical Disclosure Bulletin*, Jul. 1997, 40(7), 183-185.

Coaxial Feeder Cables [Engineering Notes], *PYE Telecommunications Limited Publication Ref No. TSP507/1*, Jun. 1975, Cambridge, England, 15 pages.
"Centralized Commerical Building Applications with the Lonworks ® PLT-21 Power Line Transceiver", *Lonworks Engineering Bulletin*, Echelon, Apr. 1997, pp. 1-22.
Plexeon Logistics, Inc., "Power Line Communications", www.plexeon.com/power.html, 2 pages.
"EMETCON Automated Distribution System: Communications Guide", *Westinghouse ABB Power T & D Company Technical Manual 42-6001A*, Sep. 1989, 55 pages.
Abraham, K.C. et al., "A Novel High-Speed PLC Communication Modem", *IEEE Transactions on Power Delivery*, 1992, 7(4), 1760-1768.
J.M. Barstow., "A Carrier Telephone System for Rural Service", *AIEE Transactions*, 1947, 66, 301-307.
Chang, S.S.L., "Power-Line Carrier", *Fundamentals Handbook of Electrical and Computer Engineering*, vol. II-Communication, Control, Devices and Systems, John Wiley & Sons, 617-627.
Chen, Y -F. et al. "Baseband Transceiver Design of a 128-Kbps Power-Line Modem for Household Applications", *IEEE Transactions on Power Delivery*, 2002, 17(2), 338-344.
Coakley, N.G. et al., "Real-Time Control of a Servosytem Using the Inverter-Fed Power Lines to Communicate Sensor Feedback", *IEEE Transactions on Industrial Electronics*, 1999, 46(2), 360-369.
Esmailian, T. et al., "A Discrete Multitone Power Line Communication System", *Department of Electrical and Computer Engineering*, University of Toronto, Ontario Canada, 2000 IEEE, pp. 2953-2956.
Kawamura, A. et al., "Autonomous Decentralized Manufacturing System Using High-speed Network with Inductive Transmission of Data and Power", *IEEE*, 1996, 940-945.
Kilbourne, B. "EEI Electric Perspectives: The Final Connection", www.eei.org/ep/editorial/Jul-01/0701conenct.htm, 7 pages.
Kim, W.-O., et al., "A Control Network Architecture Based on EIA-709.1 Protocol for Power Line Data Communications", *IEEE Transactions on Consumer Electronics*, 2002, 48(3), 650-655.
Lim, C.K. et al., "Development of a Test Bed for High-Speed Power Line Communications", School of Electrical and Electronic Engineering, Nanyang Technological University, Singapore, *IEEE*, 2000, 451-456.
Lokken, G. et al., "The Proposed Wisconsin electric Power Company Load Management System Using Power Line Carrier Over Distribution Lines", *1976 National Telecommunications Conference*, IEEE, 1976, 2.2-12.2-3.
Marthe, E. et al., "Indoor Radiated Emission Associated with Power Line Communication Systems", *Swiss Federal Institute of Technology Power Systems Laboratory IEEE*, 2001, 517-520.
Naredo, J.L. et al., "Design of Power Line Carrier Systems on Multitransposed Delta Transmission Lines", *IEEE Transactions on Power Delivery*, 1991, 6(3), 952-958.
Nichols, K., "Build a Pair of Line-Carrier Modems", *CRC Electronics-Radio Electronics*, 1988, 87-91.
Okazaki, H, et al., "A Transmitting, and Receiving Method for CDMA Communications Over Indoor Electrical Power Lines", *IEEE*, 1998, pp. VI-522-VI-528.
B. Don Russell, "Communication Alternatives for Distribution Metering and Load Management", *IEEE Transactions* on *Power Apparatus and Systems*, 1980, vol. PAS-99(4), pp. 1448-1455.

Sado, WN. et al., "Personal Communication on Residential Power lines- Assessment of Channel Parameters", *IEEE*, 532-537.

LONWORKS Engineering Bulletin, "Demand Side Management with LONWORKS® Power Line Transceivers," Dec. 1996, 36 pages.

HomePlug™Powerline Alliance, HomePlug Initial Draft Medium Interface Specification, May 19, 2000, 109 pages.

HomePlug™Powerline Alliance, HomePlug 0.5 Draft Medium Interface Specification, Nov. 28, 2000, 133 pages.

HomePlug™Powerline Alliance, HomePlug Initial Draft Medium Interface Specification, Jul. 27, 2000, 109 pages.

HomePlug™Powerline Alliance, HomePlug 1.01 Specification, Dec. 1, 2001, 139 pages.

Summary of an IEEE Guide for Power-Line Carrier Applications, A Report by the Power System Communications Committee, *IEEE Transactions on Power Apparatus and Systems*, vol. PAS-99, No. 6, Nov./Dec. 1980, pp. 2334-2337.

De Wilde, W. R. et al., "Upwards to a Reliable Bi-Directional Communication Link on the LV Power Supplies for Utility Services: Field Test in Belgium," Apr. 3-5, 1990, *Sixth International Conference on*, Manchester, UK, pp. 168-172.

Tanaka, M., "Transmission Characteristics of a Power Line Used for Data Communications at High Frequencies," IEEE Transactions on Consumer Electronics, Feb. 1989, vol. 35, No. 1, pp. 37-42.

Hasler, E. F. et al., "Communication Systems Using Bundle Conductor Overhead Power Lines," IEEE Transactions on Power Apparatus and Systems, Mar./Apr. 1975, vol. PAS-94, No. 2, pp. 344-349.

IEEE Guide for Power-Line Carrier Applications, ANSI/IEEE Std 643-1980, ©1980 by The Institute of Electrical and Electronics Engineers, Inc., pp. 1-80.

Hatori, M. et al., "Home Informatization and Standardization of Home Bus," IEEE Transactions on Consumer Electronics, Aug. 1986, vol. CE-32, No. 3, pp. 542-549.

Hunt, J. M. et al., "Electrical Energy Monitoring and Control System for the Home," IEEE Transactions on Consumer Electronics, Aug. 1986, vol. CE-32, No. 3, pp. 578-583.

Gutzwiller, F. W. et al., "Homenet: A Control Network for Consumer Applications," IEEE Transactions on Consumer Electronics, Aug. 1983, vol. CE-29, No. 3, pp. 297-304.

Burrascano, P. et al., "Digital Signal Transmission on Power Line Carrier Channels: An Introduction," IEEE Transactions on Power Delivery, Jan. 1987, vol. PWRD-2, No. 1, pp. 50-56.

Burr, A. G. et al., "Effect of HF Broadcast Interference on PowerLine Telecommunications Above 1 Mhz," ©1998 IEEE, pp. 2870-2875.

Onunga, J. et al., "Distribution Line Communications Using CSMA Access Control with Priority Acknowledgements," IEEE Transactions on Power Delivery, Apr. 1989, vol. 4, No. 2, pp. 878-886.

Tanaka, M., "High Frequency Noise Power Spectrum, Impedance and Transmission Loss of Power Line in Japan on Intrabuilding Power Line Communications," *IEEE Transactions on Consumer Electronics*, May 1988, vol. 34, No. 2, pp. 321-326.

Meng, H. et al., "A Transmission Line Model for High-Frequency Power Line Communication Channel," ©2002 IEEE, pp. 1290-1295.

Burrascano, P. et al., "Performance Evaluation of Digital Signal Transmission Channels on Coronating Power Lines," ©1988 IEEE, pp. 365-368.

DiClementi, D. A. et al., "Electrical Distribution System Power Line Characterization," ©1996 IEEE, pp .271-276.

Abraham, K. C. et al., "A Novel High-Speed PLC Communication Modem," IEEE Transactions on Power Delivery, Oct. 1992, vol. 7, No. 4, pp. 1760-1768.

Yoshitoshi, M. et al., "Proposed Interface Specifications for Home Bus," IEEE Transactions on Consumer Electronics, Aug. 1986, vol. CE-32, No. 3, pp. 550-557.

O'Neal, Jr., J.B., "The Residential Power Circuit as a Communication Medium," IEEE Transactions on Consumer Electronics, Aug. 1986, vol. CE-32, No. 3, pp. 567-577.

Dostert, K., "EMC Aspects of High Speed Powerline Communications," Proceedings of the 15th International Wroclaw Symposium and Exhibition on Electromagnetic Capability, Jun. 27-30, 2000; Wroclaw, Poland, pp. 98-102.

Piety, R. A., "Intrabuilding Data Transmission Using Power-Line Wiring," Hewlett-Packard Journal, May 1987, pp. 35-40.

"ABB joins Main.net's subsidiary, PPC, as shareholder and strategic partner for Power Line Communications," Mannheim, Germany/Kfar Saba, Israel, Oct. 8th, 2002, 2 pages.

Dostert, K., Powerline Communications, Ch. 5, pp. 286, 288-292, Prentice Hall PTR, Upper Saddle River,NJ ©2001.

Liu, E. et al., "Broadband Characterization of Indoor Powerline Channel," Communications Laboratory, Helsinki University of Technology, Finland [presented at the 2004 International Symposium on PowerLine Communications and its Applications, Zaragoza, Spain. Mar. 31-Apr. 2, 2004] 6 pages.

Kim, W-O., et al., "A Control Network Architecture Based on EIA-709.1 Protocol for Power Line Data Communications", *IEEE Transactions on Consumer Electronics*, 2002, 48(3), 650-655.

Lim, C.K. et al., "Development of a Test Bed for High-Speed Power Line Communications", School of Electrical and Electronic Engineering, Nanyang Technology University, Singapore, *IEEE*, 2000, 451-456.

Lokken, G. et al., "The Proposed Wisconsin electric Power Company Load Management System Using Power Line Carrier Over Distribution Lines", *1976 National Telecommunications Conference*, IEEE, 1976, 2.2-12.2-3.

Marthe, E. et al., "Indoor Radiated Emission Associated with Power Line Communication Systems", *Swiss Federal Institute of Technology Power Systems Labaratory IEEE*, 2001, 517-520.

Naredo, J.L. et al., "Design of Power Line Carrier Systems on Multitransposed Delta Transmission Lines", *IEEE Transactions on Power Delivery*, 1991, 6(3), 952-958.

Nichols, K., "Build a Pair of Line-Carrier Modems", *CRC Electronics-Radio Electronics*, 1988, 87-91.

Okazaki, H, et al., "A Transmitting, and Receiving Method for CDMA Communications Over Indoor Electrical Power Lines", *IEEE*, 1998, pp. VI-522-VI-528.

B. Don Russell, "Communication Alternatives for Distribution Metering and Load Management", *IEEE Transactions on Power Apparatus and Systems*, 1980, vol. PAS-99(4), pp. 1448-1455.

Sado, WN. et al., "Personal Communication on Residential Power Lines- Assessment of Channel Parameters", *IEEE*, 532-537.

* cited by examiner

POWER LINE COUPLING DEVICE AND METHOD OF USING THE SAME

FIELD OF THE INVENTION

The present invention relates, generally, to power line coupling devices and in particular, to a coupler for coupling data signals to and from power lines such as underground and overhead medium voltage cables.

BACKGROUND OF THE INVENTION

Well-established power distribution systems exist throughout most of the United States, and other countries, that provide power to customers via power lines. With some modification, the infrastructure of the existing power distribution systems can be used to provide data communication in addition to power delivery, thereby forming a power distribution communication system. In other words, existing power lines that already have been run to many homes and offices can be used to carry data signals to and from the homes and offices. These data signals are communicated on and off the power lines at various points in the power distribution communication system, such as, for example, near homes, offices, Internet service providers, and the like.

While the concept may sound simple, there are many challenges to overcome in order to use power lines for data communication. Power distribution systems include numerous sections, which transmit power at different voltages. The transition from one section to another typically is accomplished with a transformer. The sections of the power line distribution system that are connected to the customers typically are low voltage (LV) sections having a voltage between 100 volts and 240 volts, depending on the system. In the United States, the low voltage section typically is about 120 volts (120V). The sections of the power distribution system that provide the power to the low voltage sections are referred to as the medium voltage. (MV) sections. The voltage of the MV section is in the range of 1,000 Volts to 100,000 volts and typically 8.66 kilo volts (kV) to neutral (15 kV between phase conductors). The transition from the MV section to the LV section of the power distribution system typically is accomplished with a distribution transformer, which converts the higher voltage of the MV section to the lower voltage of the LV section.

Power system transformers are one obstacle to using MV or LV power distribution lines for data communication. Transformers designed for conversion of voltages at power frequencies (i.e. 50 or 60 Hz) present complex and often undesirable series and shunt impedances that can be detrimental to data signal frequencies useful for data communication. As such, power distribution communication systems face the challenge of passing the data signals around (or sometimes through) the distribution transformers.

To bypass the distribution transformer, the bypassing system needs a method of coupling data to and from the medium voltage power line. Similarly, coupling data signals to and from the medium voltage cable at a repeater and backhaul location (a location where data signals are coupled on and off the power distribution communications system) requires the same or similar coupling means. As discussed, medium voltage power lines can operate from about 1000 V to about 100 kV, and often carry high amperage. Consequently, coupling to a medium voltage power line gives rise to safety concerns for the user installing the coupling device.

The coupling device should be designed to provide safe and reliable communication of data signals with a medium voltage power line—carrying both low and high current—in all outdoor environments such as extreme heat, cold, humidity, rain, wind, high shock, and high vibration. Also, coupling around the transformer raises concern that dangerous MV voltage levels may be provided to the customer premises on the data line, which the coupling device should prevent. In addition, a coupling device should be designed so that it does not significantly compromise the signal-to-noise ratio or data transfer rate and facilitates bidirectional communication. In addition, the coupling device (or coupler as referred to herein) should enable the transmission and reception of broadband radio frequency (RF) signals used for data transmission in MV cables.

Many couplers that have been designed prior to this invention have relied on direct contact with the MV power line, which typically carries a phase-to-phase 15 kV, 60 Hertz power transmission. The phase-to-earth ground voltage of the 15 kV system is 8.66 kV. As a consequence, the electronics and power supplies associated with the couplers have to be built to isolate the 8.66 kV potential from earth ground. Various embodiments of the coupler of the present invention may provide many of the above features and overcome the disadvantages of the prior art.

SUMMARY OF THE INVENTION

The coupler of the present invention couples data signals, such as broadband RF signals, to and from a power line. The coupler of one embodiment that is for use with overhead power lines includes a length of URD MV cable with the neutral conductor removed. The URD cable is communicatively coupled to the MV power line at each end on opposite sides of a power line data impedance, which may be a low pass filter or RF choke. A second data signal impedance may be communicatively coupled to the URD MV cable between first and second data couplers, which may be coupling capacitors. The data couplers may be communicatively coupled to opposite ends of a winding of a transformer and the neutral semi-conductive jacket of the URD cable may be coupled to ground via a low frequency conductive path.

Further features and advantages of the present invention, as well as the structure and operation of various embodiments of the present invention, are described in detail below with reference to the accompanying drawings.

BRIEF DESCRIPTION OF THE DRAWINGS

The accompanying drawings, which are incorporated herein and form part of the specification, illustrate various embodiments of the present invention and, together with the description, further serve to explain the principles of the invention and to enable a person skilled in the pertinent art to make and use the invention. In the drawings, like reference numbers indicate identical or functionally similar elements.

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

In the following description, for purposes of explanation and not limitation, specific details are set forth, such as particular networks, communication systems, computers, terminals, devices, components, techniques, data and network protocols, software products and systems, enterprise applications, operating systems, development interfaces, hardware, etc. in order to provide a thorough understanding of the present invention.

However, it will be apparent to one skilled in the art that the present invention may be practiced in other embodiments that depart from these specific details. Detailed descriptions of well-known networks, communication systems, computers, terminals, devices, components, techniques, data and network protocols, software products and systems, operating systems, development interfaces, and hardware are omitted so as not to obscure the description of the present invention.

I. System Architecture and General Design Concepts

The coupler of the present invention may be used in a transformer bypass device, a backhaul point, a repeater, or at any location at which it is desirable to couple data signals to and/or from a power line. The present invention may be used to communicate data signals with (i.e., couple data signals to and/or from) both underground and overhead power lines.

Figure 1:
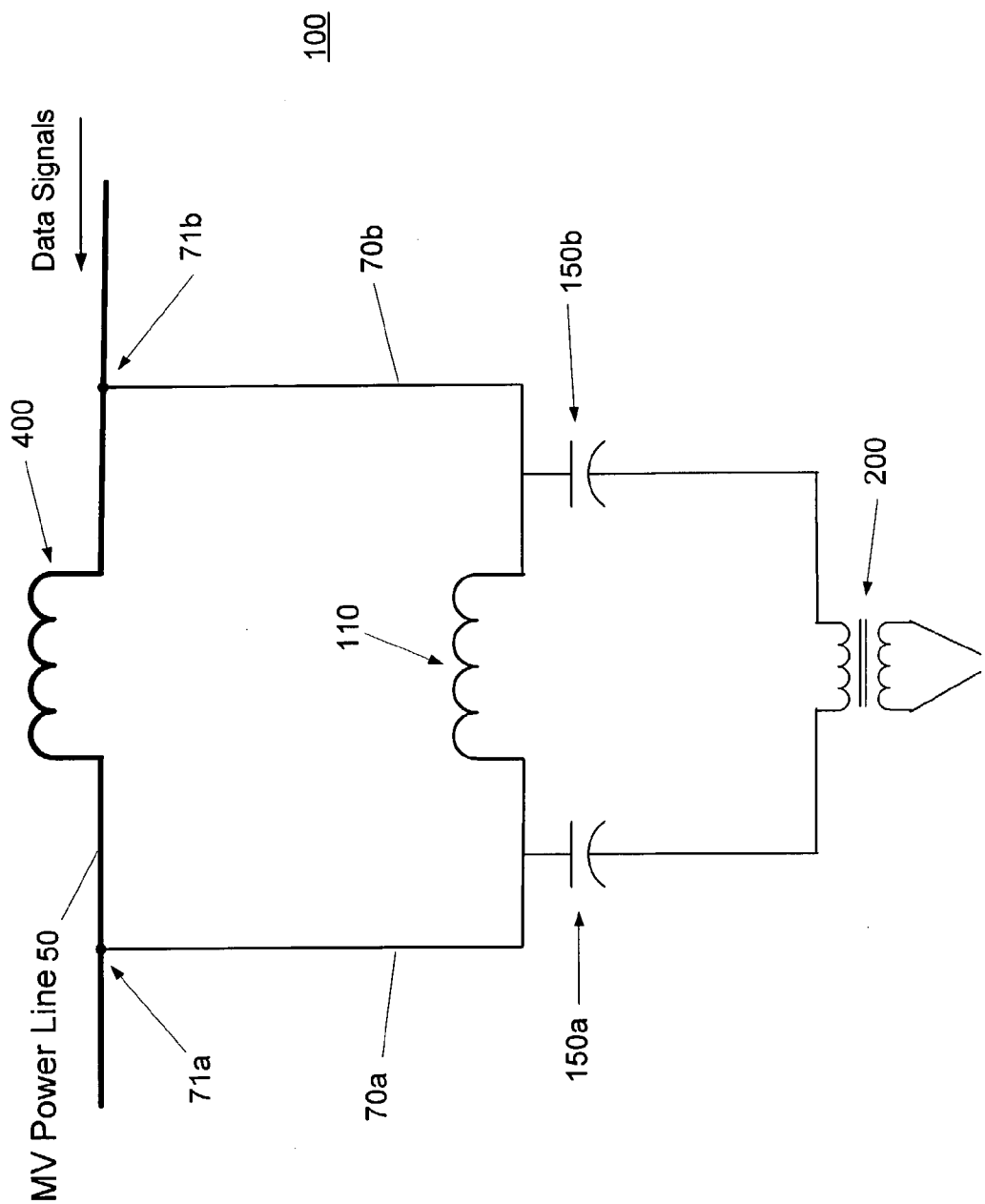
FIG. 1 is a schematic of an example embodiment of a coupler according to the present invention.

FIG. 1 is a schematic of an example embodiment of a coupling device 100 according to the present invention that is designed to couple data signals on and off an overhead MV power line 50. The coupler 100 includes a data impedance 110, which may be an RF choke (or other high frequency (e.g., RF) inductive, capacitive, and/or resistance impedance) or low pass filter, connected to the MV power line 50 by a first lead 70a and a second lead 70b. A power line data impedance, such as RF choke 400 (or other high frequency (e.g., RF) inductive, capacitive, and/or resistance impedance) or low pass filter, is communicatively coupled to the MV power line 50 between the connection points 71a and 71b of the first and second leads 70a and 70b. The leads 70a and 70b are also coupled to data couplers, such as coupling capacitors 150a and 150b, respectively. The coupling capacitors 150 are further coupled to opposite ends of the first winding of a transformer 200. The second winding of the transformer 200 may be communicatively coupled to a connector (not shown) that is adapted to connect to circuitry of a power line communication device, such as a transformer bypass device, a backhaul point, a repeater, or other device designed to communicate data via the MV power line 50.

When receiving data with the embodiment shown in FIG. 1, data signals traveling down the MV power line 50 (as shown in FIG. 1) will be substantially shunted around (and by) the power line data impedance (e.g., RF choke 400) and travel through lead 70b. Data impedance 110 (e.g., a RF choke) will then shunt the data signals through a first data coupler (e.g., coupling capacitor 150b), the first winding of transformer 200, a second data coupler (e.g., coupling capacitor 150a), lead 70a and back on to the MV power line 50. The mutual inductance of the first and second windings of the transformer 200 induces a corresponding data signal on the second winding of the transformer 200, which is supplied to a connector for processing by a communication device, which may include a filter, amplifier, and/or modem. As will be discussed below, coupling capacitors 150a and 150b communicate signals in the radio frequency spectrum (such as the data signals) but prevent the communication of the low frequency signals (such as the power signals). Thus, the data couplers, which in this example embodiment are coupling capacitors 150a and 150b, in conjunction with the impedance of other connections and/or components, such as transformer 200, may be considered high pass filters.

Figure 2:
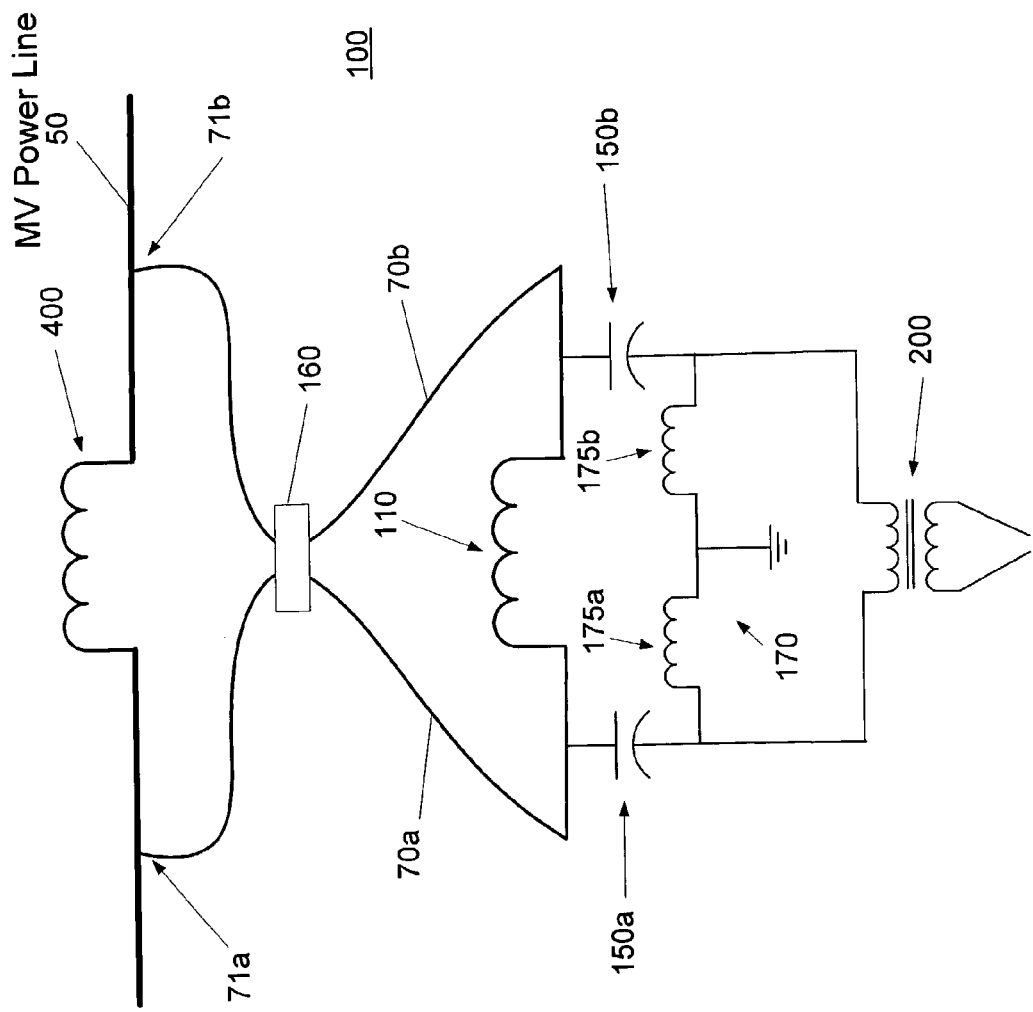
FIG. 2 is a schematic of another example embodiment of a coupler according to the present invention.

FIG. 2 illustrates an alternate embodiment of the present invention for use with overhead power lines in which a common mode choke 160 is communicatively coupled to leads 70a and 70b. The common mode choke 160 may reduce the through loss of the coupler 100 by allowing differential signals (such as the differential signals representing data) to pass through the choke 160 unimpeded while impeding the common mode signals (such as the common mode signals representing data), which typically do not enhance the reception of the data signal. Because the common mode portion of the data signals are impeded from entering the coupler, the coupler 100 does not absorb, use, or radiate much common mode energy thereby reducing the through loss of the coupler.

Figure 3:
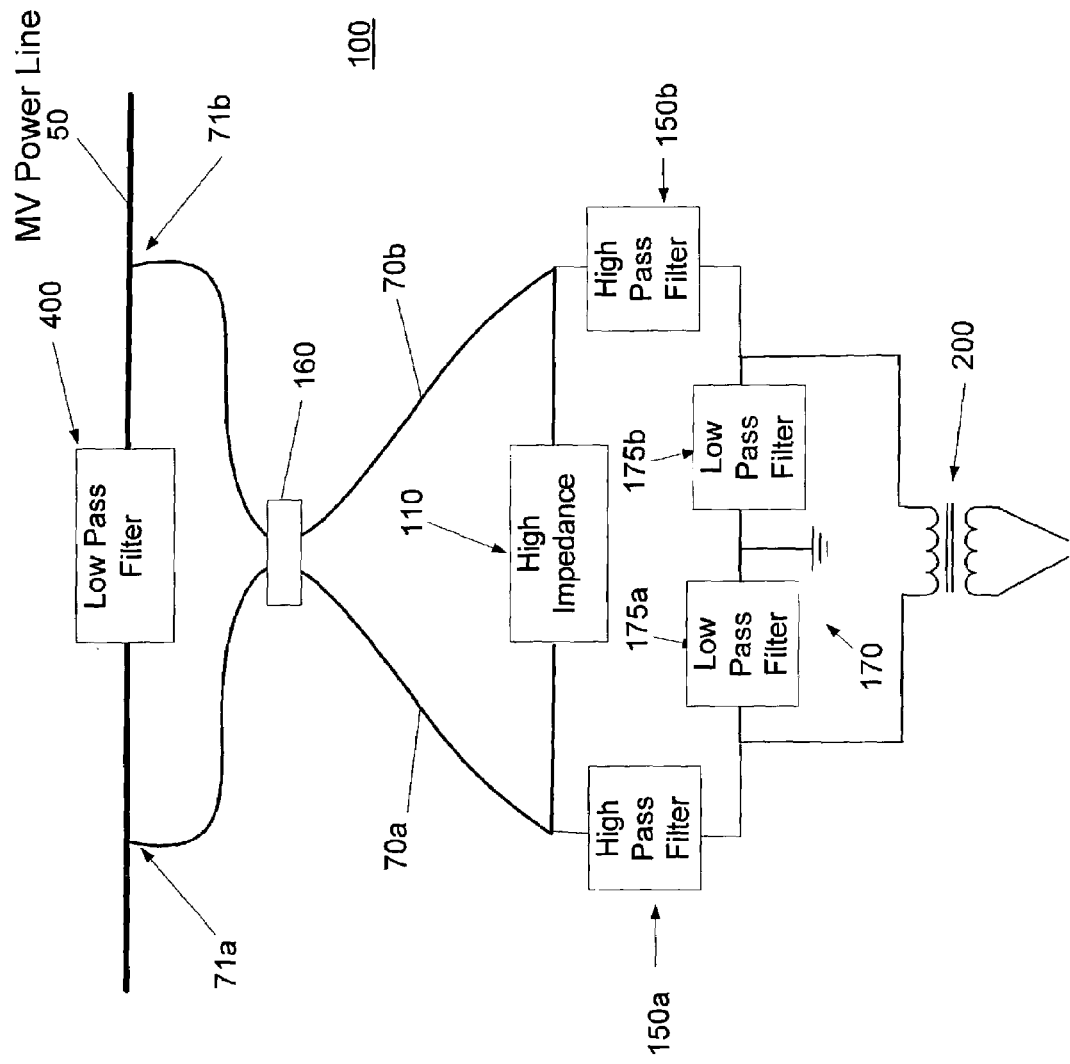
FIG. 3 is a functional block diagram of the embodiment of FIG. 2.

FIG. 3 provides a functional block diagram of the schematic of FIG. 2. As shown in FIG. 3, in this embodiment the RF choke acts a low pass filter 400 in communication with the power line 50. The first port of the high pass filters (150a and 150b) are coupled to opposite ports of the high impedance 110 and to the power line 50. The second port of high pass filters 150a and 150b are coupled to opposite ends of a winding of the transformer 200. In addition, the second port of the high pass filters 150a and 150b are coupled to low pass filters 175a and 175b, respectively, which are in turn, coupled to a ground potential.

Figure 4:
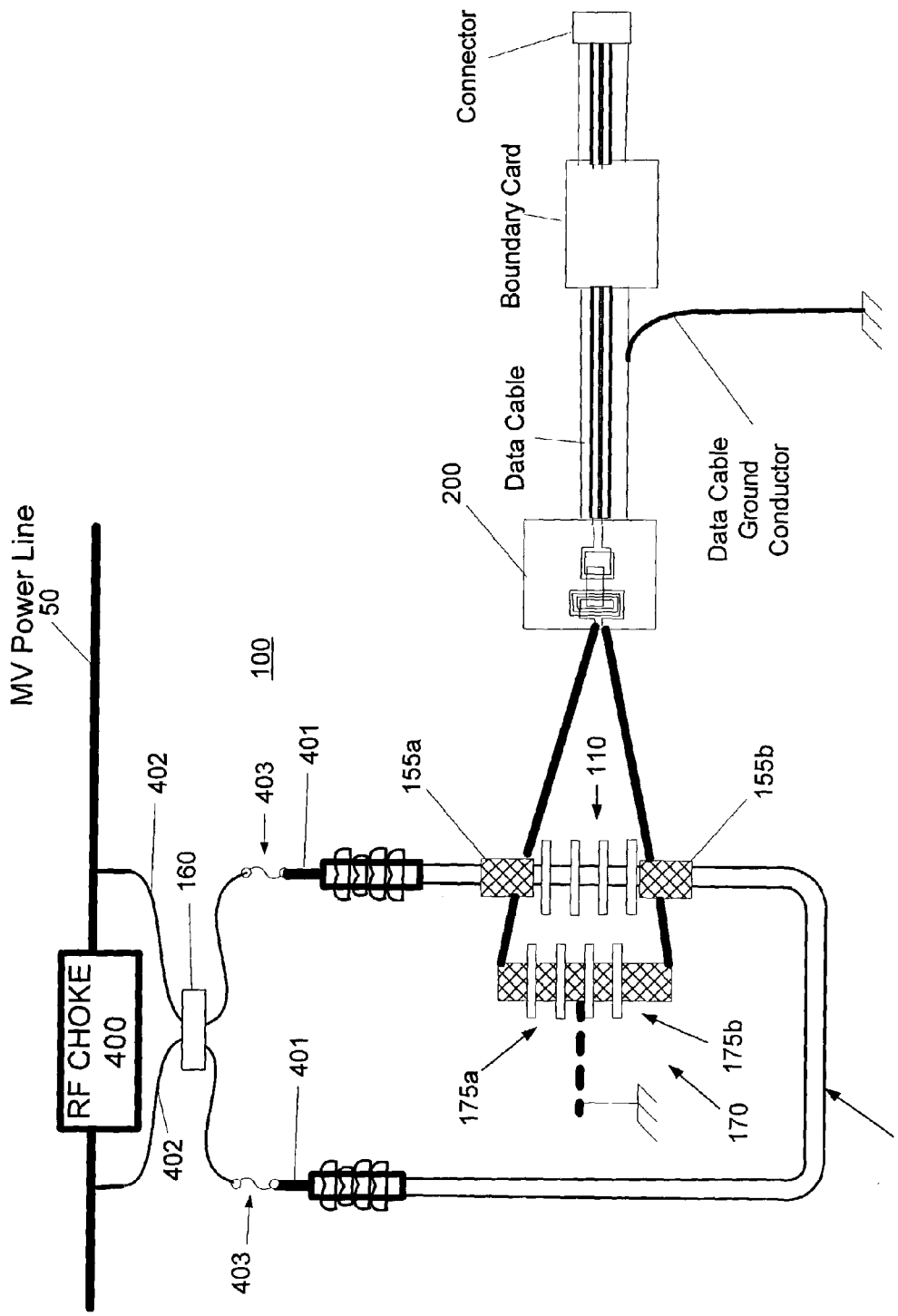
FIG. 4 is a representation of a example embodiment of a coupler according to the present invention.
Figure 5:
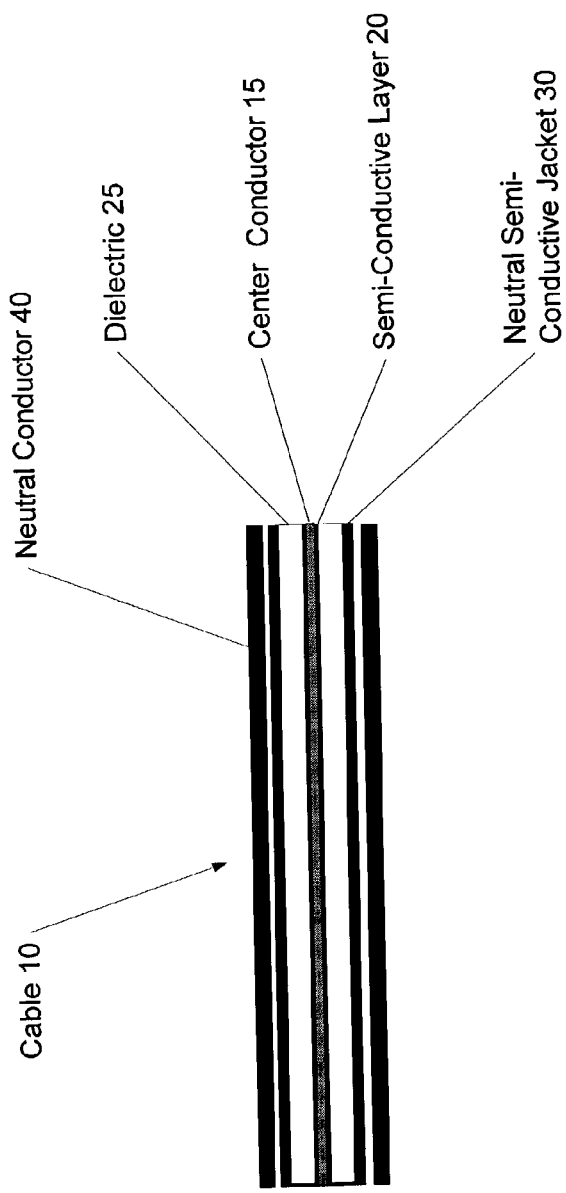
FIG. 5 is a cross sectional view of an example URD MV cable.

FIG. 4 illustrates an implementation of the embodiment shown in FIGS. 2 and 3. This implementation makes use of the architecture of existing URD MV cables. As shown in FIG. 5, the URD MV cable 10 includes a center conductor 15 that carries the power signal. Surrounding the center conductor 15 is a semi-conductive layer 20. The semi-conductive layer 20 is surrounded by a dielectric 25 (i.e., an insulator). A neutral semi-conductive jacket 30 surrounds the dielectric 25. The neutral semi-conductive jacket 30 typically ensures, among other things, that ground potential and deadfront safety (the grounding of surfaces to which a lineman may be exposed) are maintained on the surface of the cable. Finally, a neutral conductor 40 surrounds the neutral semi-conductive jacket 30. This implementation (shown in FIG. 4) does not use the neutral conductor 40, which may be removed from the cable 10. Some URD MV cables, which may be used with or form part of the present invention, may include additional or fewer components than those identified herein.

To couple signals to and from the overhead MV cable 50, the coupler 100 is formed with a length of URD MV cable 105, which maybe six gauge, eight kV cable. In this embodiment, the center conductor 15 of each end of the URD MV cable 105 is terminated with a stem connector 401 with a pothead insulator. The connection of the stem connector 401 to a URD cable is well-known in the art. One means for connecting the stem connector 401 to the URD cable 105 is using a 3M Quick Term II Termination Kit, sold by 3M Corporation. Each stem connector 401 is attached to the overhead MV cable 50 via a fuse 403 and a connection lead 402. Both connection leads 402 travel through the common mode choke 160, which in this embodiments may be one or more ferrite toroids. In addition, each connection lead 402 may be wound around the toroid (or toroids) to thereby increase the impedance of the choke and reduce the number of toroids necessary. Furthermore, while the fuses 403 are shown on the coupler side of the common mode choke 160, they may alternately be on the power line side of the common mode choke 160 (e.g., between the connection leads 402 and the MV power line).

A power line data impedance, such as a RF choke 400, is disposed on the MV power line 50 between the connection points of the connection leads 402. The power line data impedance allows the power signals to pass unimpeded, but provides a high impedance to data signals. As a result, data signals are shunted around the impedance 400, through the connection leads 402 and fuses 403 to the URD MV cable 105. In this embodiment, the RF choke 400 may be formed of ferrite toroids, which are formed of two halves with each half in a portion of a housing. The housing portions may be hinged together to allow for an open and a closed configuration so that the toroids may be coupled to the MV power line without disrupting power to customers. The housing is designed so that the ferrite toroid halves mate together when the housing is in the closed configuration. Such a housing is disclosed in U.S. application Ser. No. 10/176,500 entitled "A Power Line Coupling Device and Method of Using the Same," which is hereby incorporated by reference.

As is known in the art, a capacitor may be formed by a first and second conductor separated by a dielectric. The first and/or second conductor may be a conductive surface or plate. Coupling capacitors 150a and 150b (discussed with reference to FIG. 2) are formed, in part, by a tubular metal braids 155a and 155b that are approximately six inches long and inserted over, and extend substantially around, the circumference of the URD cable 105. In this example embodiment, the metal braid is one half inch in diameter and ten gauge.

As discussed above, the URD cable includes a dielectric 25 disposed around the center conductor 15. Thus, the combination of the center conductor 15 and dielectric 25 (i.e., insulator) of the URD cable 105, in conjunction with the two tubular metal braids 155a and 155b (and to a lesser extent, the other URD cable components), form the first and second coupling capacitors 150a and 150b, respectively. The tubular metal braids 155a and 155b, in conjunction with the URD cable 105, provide capacitors that can withstand the high voltages of the MV power line and that are economical to manufacture. The metal braids 155a and 155b (and thus the coupling capacitors 150a and 150b) are electrically connected to opposite ends of the primary winding of the transformer 200. This connection may or may not be a direct connection (i.e., a transmission line of variable length, circuit networks or devices of some kind could be added therebetween to shape the signal spectrum or improve its data transmission characteristics).

Disposed between the metal braids 155a and 155b is a data impedance 110 (and, depending on the frequency of the carrier of the transmission signal, may be a low pass filter), which in this embodiment is an RF choke (which acts as an inductor) comprised of a one or more ferrite toroids that provide an impedance to the data signals traveling through the center conductor 15 of the URD cable 105. Thus, this data impedance 110 shunts the data signals through the coupling capacitors 150a and 150b.

In this embodiment, the tubular braids 155a and 155b also are connected to a ground pathway. As discussed above, with the neutral conductor 40 removed from the URD cable of this embodiment, the neutral semi-conductive jacket 30 is the outer layer of the URD cable 105. Typically, the neutral conductor 40 of a URD cable grounds the power signal if and when the MV power signal pierces the insulating layers of the cable. In this embodiment, if the medium voltage power signal were to pierce the insulating layers of the URD cable 105 (e.g., due damage to the cable) the neutral semi-conductive jacket 30 would be energized to the voltage of the MV power line, which may be tens of thousands of volts, but not be in contact with a neutral conductor 40 to ground the power signal. In addition, the neutral conductor 40 of a URD cable typically is used to ground leakage currents that reach the semi-conductive jacket 30. Thus, without a neutral conductor 40, leakage currents could energize the neutral semi-conductive jacket 30 to the voltage of the MV power line.

To ground the voltage on the neutral semi-conductive jacket 30, the neutral semi-conductive jacket 30 is connected to a ground pathway 170 that allows one or both fuses 403 to open. Thus, if a fault occurs (e.g., the MV and significant current reaches the neutral semi-conductive jacket 30) the neutral semi-conductive jacket 30 of the URD cable 105 will conduct the high voltage signal to the metal braids 155, which will conduct the high voltage signal through the ground pathway 170 to ground allowing one or both fuses 403 to open. In addition, leakage currents (e.g., that may pass through capacitors 150a and/or 150b) that reach the neutral semi-conductive jacket 30 will also be conducted to ground through the ground pathway 170. The ground pathway 170 includes a first ground pathway data impedance 175a and a second ground pathway data impedance 175b that prevent the data signal from being shorted to ground through the ground pathway 170. Thus, the ground pathway in this embodiment is a low frequency ground pathway, because the data signals are transmitted using a high frequency carrier. In this embodiment, the ground pathway 170 is formed of two lengths of metal braids that are connected to ground and that traverse though a first and second set of ferrite toroids, respectively. The first and second set of ferrite toroids form the first ground pathway data impedance 175a and second ground pathway data impedance 175b, respectively.

As discussed, metal braids 155a and 155b are electrically connected to opposite ends of the primary winding of the transformer 200. As shown in FIG. 4, the secondary winding of the transformer 200 may be coupled to a boundary card (that includes a fuse and other circuitry for breaking the data cable should a fault occur) that is coupled to a connector. The second winding of the transformer 200 may be in communication with a transceiver (e.g., via the connector). The receiver portion of the transceiver may include an amplifier, filter, demodulator (e.g., a modem), and processor. The transmitter portion of the transceiver may include an amplifier, filter, modulator (e.g., the same or different modem as the receiver portion) and processor.

Figure 6:
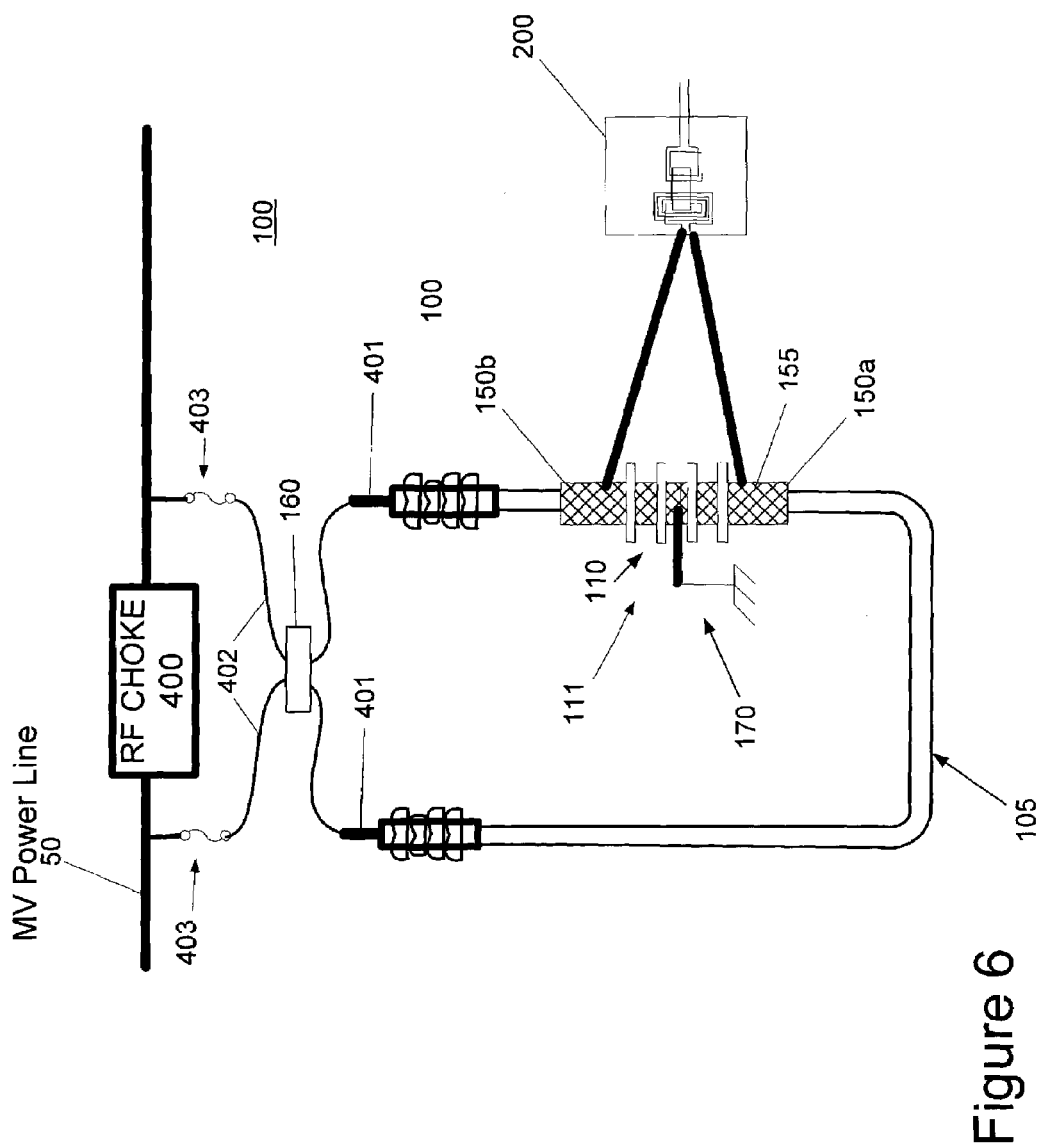
FIG. 6 is a representation of another example embodiment of a coupler according to the present invention.

In another embodiment of the present invention, the data impedance, which is an RF choke 110 in this embodiment, also forms the first ground pathway data impedance 175a and the second ground pathway data impedance 175b. Referring to FIG. 6, in this embodiment the metal braid 155 extends over a length of the URD cable 105. The data impedance or RF choke 110 may be comprised of one or more ferrite toroids that extend around the circumference of the tubular braid (and URD cable 105) near the braid's center portion. As will be noted from the figure, the metal braid 155 extends outwardly beyond each end of the data impedance or RF choke 110.

The ends of the metal braid 155 (e.g., the portions that extend beyond the ends of the data impedance 110) along with the center conductor 15 and dielectric 25 of the URD cable 105 form the coupling capacitors 150a and 150b. In addition, the ground pathway of this embodiment is a lead extending from a center tap of the data impedance or RF choke 110 to ground.

If a fault occurs (e.g., the MV reaches the neutral semi-conductive jacket 30) the neutral semi-conductive jacket 30 of the URD cable 105 will conduct the high voltage signal to the metal braid 155, which will conduct the high voltage signal through the center tap to ground allowing one or both fuses 403 to open. In addition, the center tap conducts leakage currents to ground to ensure that the neutral semi-conductive jacket 30 of the URD cable 105 remains at ground potential.

Figure 7:
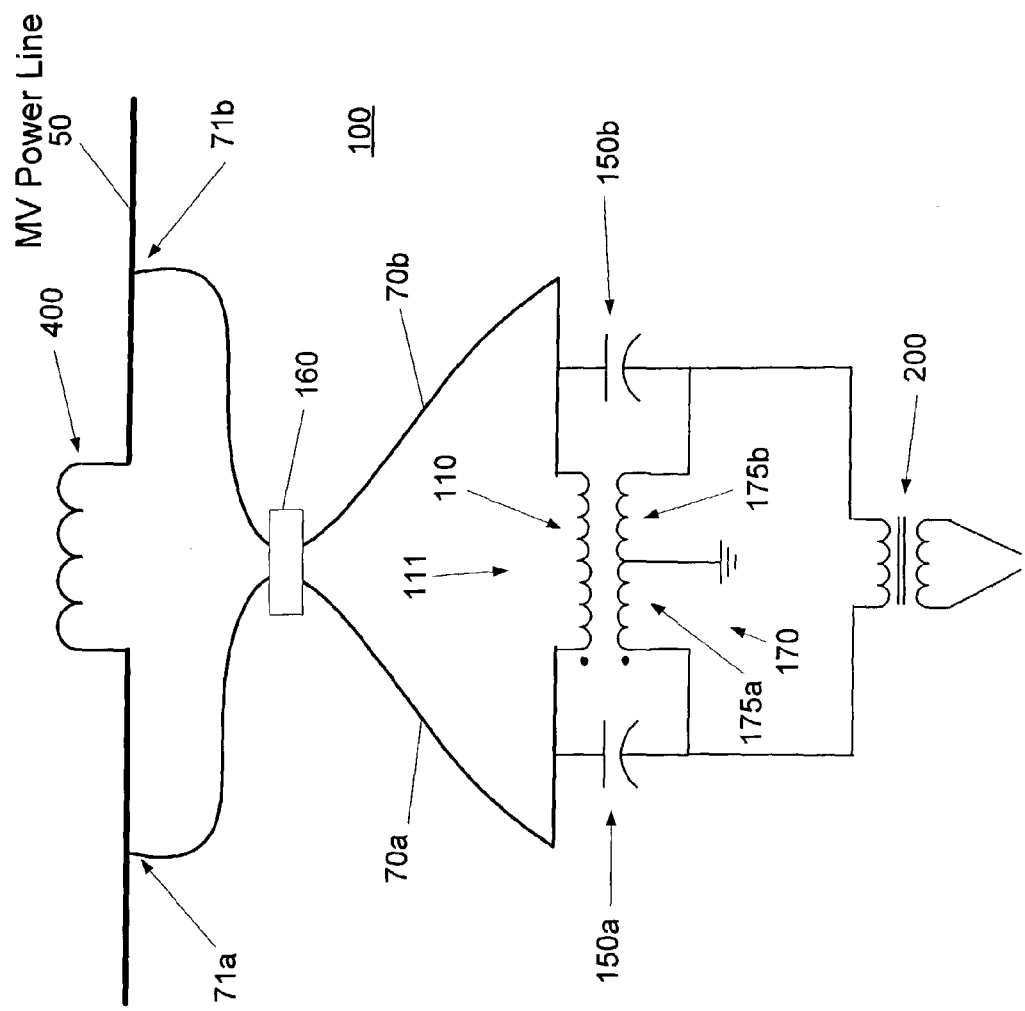
FIG. 7 is a schematic of an the example embodiment of the coupler shown in FIG. 6.

Referring to FIG. 6 and FIG. 7, which is a schematic representation of FIG. 6, this embodiment also includes a coupling transformer 111. The metal braid 155 traversing through the ferrite toroids of the RF choke 110 forms a first winding of the coupling transformer 111. The center conductor 15 of the URD cable 105, which also traverses through the ferrite toroids of the RF choke 110, forms a second winding of the coupling transformer. The first and second winding of the coupling transformer 111 are both single turn windings in this embodiment.

For data communications at higher carrier frequencies, very little of the current representing data travels through the RF choke 110 (which is a high impedance at higher carrier frequencies). Instead, the data signals are shunted through the transformer 200 via the coupling capacitors 150a and 150b, which have a lower impedance (at the higher carrier frequencies). For data communications at lower carrier frequencies (in comparison to higher carrier frequencies), the capacitors 150a and 150b have a high impedance and the RF choke 110 acts as an inductor having a lower impedance that permits communication of the data signals through the RF choke 110. Consequently, at lower frequencies the data signals are inductively coupled from the second winding (i.e., the center conductor 15) of the coupling transformer to the first winding (i.e., the metal braid 155) of the coupling transformer 111. For data communications at carrier frequencies between the higher and lower frequencies (hereinafter "medium" carrier frequencies), the coupler 100 may couple the data signals both capacitively (through capacitors 150a and 150b) and inductively (through the coupling transformer 111). Thus, this embodiment comprises both a capacitive coupler and an inductive coupler.

As will understood to those skilled in the art, the terms "lower", "medium", and "higher"—as they relate to carrier frequencies—denote relative frequencies and are not meant to refer a specific frequency range. Consequently, a first embodiment of the present invention may be designed so that the higher carrier frequencies are in a first frequency range and a second embodiment of the present invention may be designed so that medium carrier frequencies (or lower carrier frequencies) are in that same first frequency range. Thus, in this embodiment the specific carrier frequencies that are capacitively coupled, inductively coupled, or capacitively and inductively coupled are determined by the design of the coupler and dependent on capacitance of the coupling capacitors, the inductance of the coupling transformer, and many other factors.

Irrespective of the embodiment of the present invention, in practice the coupler 100 will have an input impedance composed of an equivalent resistance and an equivalent reactance. The equivalent resistance corresponds to the real power transferred. The equivalent reactance is caused by the coupling capacitors, any characteristic inductances, any parasitic capacitances, and complex equivalent networks created by the implementation of the coupler. If the input impedance is dominated by the reactance, the percentage of power of the data signal that is coupled to the power line is reduced (i.e., influences the power factor). By adding the appropriate reactance, a coupling circuit can be created that has a resonant frequency near the center of the communication band carrying the data signals to thereby increase and/or optimize the portion of the data signal power coupled to the power line (i.e., reduce the amount of power lost in the coupler itself. The geometry, placement, size, insulation, and other characteristics of the components of the coupler (e.g., the coupling capacitors and windings of the transformer 200) provide a reactance, that in this example embodiment of the present invention, provides a coupling circuit having a resonant frequency substantially at the center of the band of frequencies communicating the data signals, which is in this embodiment is approximately 40 Mhz (i.e., the center between the 30 Mhz and 50 Mhz communication channel). Providing a resonant frequency at the center of the band of frequencies communicating the data signals provides a coupling circuit that is matched to, and may provide improved performance over, the communication channel. The addition of an inductor-capacitor-resonant circuit may improve the power factor of the device in some embodiments. Other embodiments (due to manufacturing) may have resonant frequencies within twenty percent, more preferably within ten percent, and still more preferably within five percent of the center of the band of frequencies communicating the data signals. However, it may desirable to design the coupler 100 so that the resonant frequency is twenty percent, or more preferably ten percent, or still more preferably five percent below the lowest (or above the highest) frequency communicating the data signals. Designing the resonant frequency to be outside the band of frequencies communicating data signals may provide a more consistent insertion loss and through loss from installation to installation.

The coupler 100 operates as described above to couple signals to and from the MV power line. The data signals are transmitted on the overhead MV cable 50 in both directions away from the power line data impedance. It should be noted that the figures herein are not drawn to scale and are for illustrative purposes. For example, the toroids that comprise the RF choke 110, the first ground pathway data impedance 175a, and a second ground pathway data impedance 175b are preferably adjacent to each other, but shown spaced apart in the figures for illustrative purposes. Similarly, the metal braids 155 and RF choke 110 are shown mounted to the URD cable 105 in a location that is closer to one of the stem connectors 401 than the other, which may be a design choice. However, in some embodiments it may be preferable to mount the components substantially midway between the two stem connectors and/or connection points to the power line.

While not shown in the other figures, the choke 110 and braids 155 are preferably packaged in an environmentally protective, insulative encasing and/or disposed in a protective housing. In addition, the device may include a 0.150 inch layer of epoxy between the choke 110 and the URD cable (the semi-conductive jacket 30) and between the choke 110 and the external protective packaging. Similarly, the entire length of the URD MV cable 105 may be packaged in an environmentally protective, insulative material.

As will be evident from the above description, the coupler 100 of the above embodiment is not voltage referenced to the MV conductor. Because the coupler 100 is surrounded by cable components which are at ground potential, the electronics and power supplies associated with the coupler (e.g., in the associated device components— modems, router, filters, amplifiers, processors and other signal processing circuitry of the backhaul device, bypass device, repeater or other device processing received and/or transmitted signals) do not have to be built to isolate the 8.66 kV potential from earth ground or from the low voltage power lines (which may be connected to the customer premises), which greatly reduces the complexity and cost of such a system. In other words, the coupler of the present invention provides electrical isolation from the power lines (due to the insulation provided by the URD cable) while facilitating data communications therewith.

In practice, a first coupler 100 may communicate with a second coupler 100 that is on the same MV phase conductor as the first coupler or on a different MV phase conductor (such as one of the other phase conductors, the neutral, or a conductor of a different three phase conductor set). Thus, the present invention facilitates communicating across conductors as well as through a single conductor.

As discussed, the coupler 100 couples data signals (e.g., RF signals) to and/or from a power line, which, in the embodiment above, is a medium voltage power line. Other embodiments of the present invention may be used to couple signals to low voltage and/or high voltage power lines.

In addition to overhead power lines, the coupler 100 of the present invention also may be used to couple data signals to and/or from URD cables providing power. An embodiment for such an application may use the same, or different components, as any of the embodiments described above as will be understood to those skilled in the art. One example embodiment for coupling data signals to and from a URD MV cable includes those components shown in FIG. 4 (or FIG. 6) that are between stem connectors 401. Thus, such an embodiment may not need the power line data impedance (e.g., RF choke 400), stem connectors 401, the connection leads 402, or the fuses 403. The common mode choke 160 may be omitted or placed elsewhere such as on the conductors connecting the braids 155 to the transformer 200. In addition, the neutral conductor that normally forms part of a URD cable may be extended outside of the RF choke 110.

The coupler 100 may be located at any desired location to couple data signals to and/or from a power line, including at a backhaul point or forming part of a transformer bypass device at a transformer. Such a bypass device may include one or more of a low voltage signal processing circuit (which may include a filter, amplifier, and other components) a modem, a processor and associated software, a router, a medium voltage modem, and medium voltage processing circuitry. Likewise, a backhaul device and repeater may include some subset of these components and/or other components.

URD MV cables typically are hundreds of meters long and typically extend from transformer to transformer. Consequently, a version of the coupler 100 may be integrated into the end of the URD MV cable (during manufacturing or through a postproduction process) so that the coupler 100 resides inside the transformer enclosure (e.g., a pad mounted transformer). Alternatively, the coupler 100 may be formed as an adapter that has a first end with a first connector (e.g., a plug) that is configured to mate with a socket of the transformer and a second end that has a second connector (e.g., a receptacle) that is configured to mate with the end or plug of a conventional URD MV cable, which is preferably a conventional, commercially available MV cable. In addition, in any of the embodiments the entire coupler 100 may be encased in environmentally protective encasing and/or disposed in a protective housing—for example, so that only the URD MV cable and the data cable (including the connector) extend from the encasing or housing.

Extending from the pad mounted transformer enclosure typically is a number of low voltage power lines. One use of the coupler 100 is to couple data signals to and from the URD MV cable as part of a transformer bypass device. The transformer bypass device transmits signals, which may be based on the signals received though the coupler 100, to one or more of the low voltage lines that extend to the customer premises from the transformer enclosure. Similarly, the bypass device provides signals, at least a portion of which are based on data signals received from the low voltage power lines of customer premises, to the coupler 100 for transmission down the MV URD cable.

In addition, transformer enclosures often have two URD MV cables extending therefrom. For example, one of the two cables may carry power from the power source (referred to herein as a power input cable) and the other cable may transmit power down line to further destinations (referred to herein as a power output cable). In addition to or instead of providing communications through the low voltage power lines, the coupler of the present invention may form part of a repeater device that acts as an amplifier or repeater to transmit the data signals received from a coupler coupled to a first power line (e.g., a power input cable) through a second coupler and down a second power line (e.g., a power output cable). Alternatively, the repeater may receive and transmit (e.g., directionally transmit to amplify or repeat the signal) through the same coupler so that only a single coupler is necessary. The repeater device may amplify and transmit all the data signals, select data signals such as those having destination addresses for which transmission down the second cable is necessary, those select data signals that it determines should be repeated (such as all data signals not transmitted to the repeater itself, those data signals that a bypass device (or other device) indicates should be repeated, some other set of data signals as may otherwise be desired, and/or some combination thereof. Thus, the bypass and repeater devices may include a router.

In one example application, a first and second coupler 100 is disposed at the end of two URD MV cables (either integrated therein or in an adapter) that extend from the same (or nearby) transformer enclosure. The transformer bypass device is communicatively coupled to both couplers 100 and to any of the low voltage cables along which data signals may need to be communicated. Thus, the bypass device may act as both a repeater and bypass device.

As will be evident to one skilled in the art, many of the components of the above embodiments may be omitted or modified in alternate embodiments. For example, instead of a tubular metal braid, another material, conductor, or item may be used to construct the coupling capacitors or other data coupler. In addition, the tubular metal braids, or other object, may not extend around the entire circumference of the URD cable.

Also, the data cable may connect the second winding of the transformer 200 to the data processing circuitry, which may include one or more of a filter, an amplifier, an isolator, a modem, a processor, and a data router. Such circuitry, as well as a repeater, bypass device, backhaul point, and system with which the present invention may be used is described in U.S. application Ser. No. 10/319,317 entitled "A Power Line Communication Apparatus and Method of Using the Same", filed Dec. 13, 2002, which is hereby incorporated by reference.

In addition, as will be evident to those skilled in the art, the number, placement, and size of the toroids used in the invention are a design choice. In addition, the material from which the toroids are formed may be material other than ferrite as will be understood to those skilled in the art.

Depending on the desired isolation, the impedance of the URD MV cable, and other factors, the coupling capacitors may be coupled to components other than the transformer 200. While the toroids are used in the above embodiments, alternate embodiments may employ partial toroids such as a three quarter toroid, a half toroid, a toroid with a gap, or a non-toroid shaped core.

As is well known to those skilled in the art, the power line data impedance (e.g., RF choke 400 or low pass filter) and/or data impedance 110 may be any device, circuit, or component for filtering (i.e., impeding the passage on high frequency signals such as an inductor, which, for example, may be a ferrite toroid (or ferrite bead). In addition, instead of a choke, the URD cable may be bisected between the two coupling capacitors or data couplers. Thus, the URD cable would include a first and second portion with each being communicatively coupled to the power line at one end and have a conductor (e.g., a metal braid) near its other end.

Figure 8:
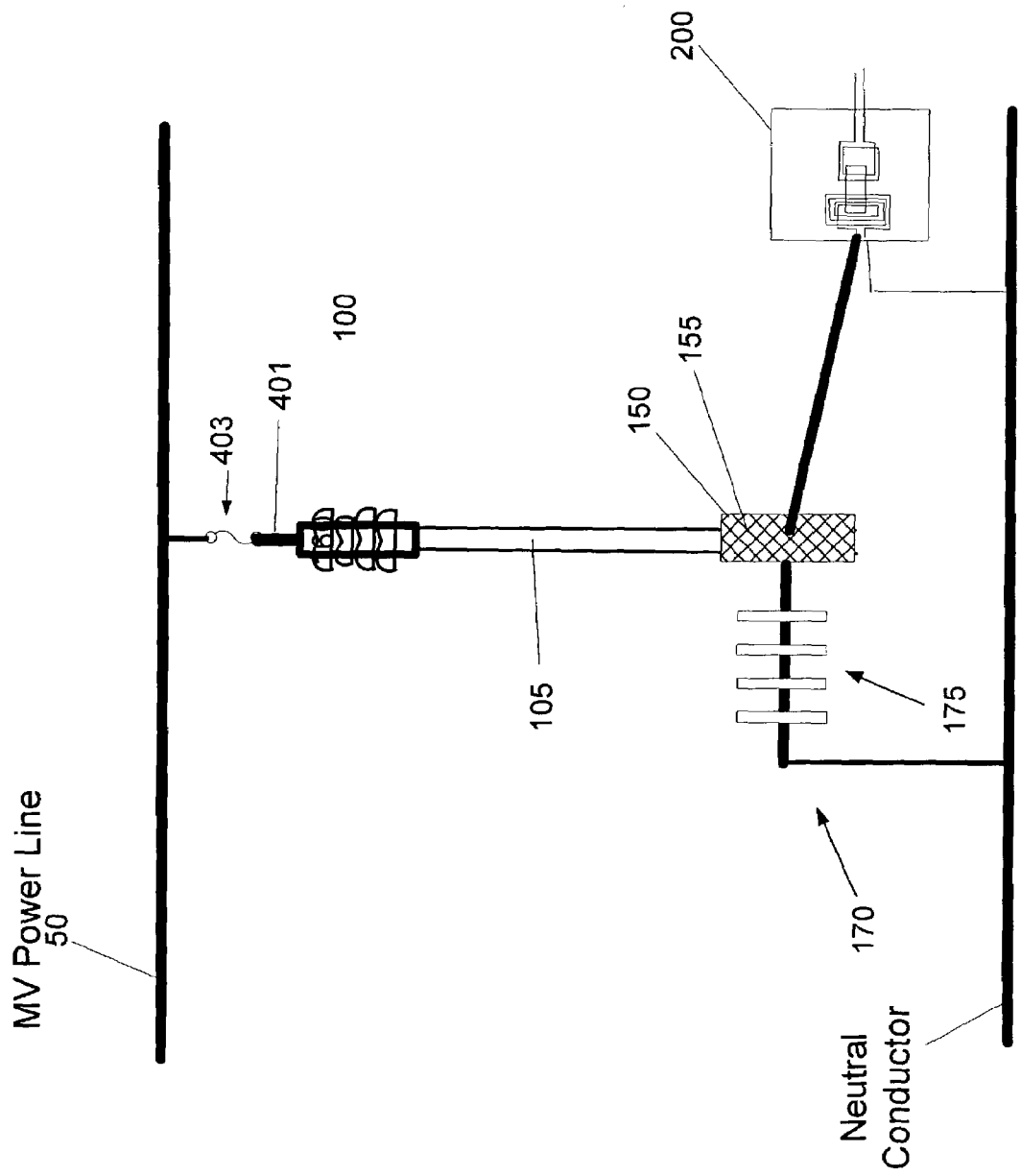
FIG. 8 is a representation of another example embodiment of a coupler according to the present invention.

In still another embodiment shown in FIG. 8, the invention is comprised of a URD cable 105 with a first end communicatively coupled to the power line 50 and a conductor, such a metal braid 155, forming a coupling capacitor 150 near its other end. The coupling capacitor 150 also may be coupled to one end of the primary of the transformer 200 while the other end of the transformer winding may be connected to a neutral conductor (or alternatively connected to a ground potential). In addition, the neutral semi-conductive jacket 30 may be coupled to the neutral conductor (or alternatively to ground potential) via a low frequency ground path 170 that includes a ground pathway data filter 175. In order to alter the inductance of the coupler (e.g., so that the URD cable 105 can be made shorter), one or more ferrite toroids may placed over URD cable (not shown), and/or a connection lead may be added between the URD cable and the power line 50.

Finally, the embodiments of the present invention described herein include a semi-conductive jacket. However, some embodiments may not employ a semi-conductive jacket.

The foregoing has described the principles, embodiments, and modes of operation of the present invention. However, the invention should not be construed as being limited to the particular embodiments described above, as they should be regarded as being illustrative and not as restrictive. It should be appreciated that variations may be made in those embodiments by those skilled in the art without departing from the scope of the present invention.

While a preferred embodiment of the present invention has been described above, it should be understood that it has been presented by way of example only, and not limitation. Thus, the breadth and scope of the present invention should not be limited by the above described exemplary embodiments.

Obviously, numerous modifications and variations of the present invention are possible in light of the above teachings. It is therefore to be understood that within the scope of the appended claims, the invention may be practiced otherwise than as specifically described herein.

What is claimed is:

1. A device for communicating data signals with a power line, the device comprising:
   a cable comprising an internal conductor and an insulator;
   an outer conductor;
   wherein said insulator is disposed between said outer conductor and said internal conductor;
   a magnetically permeable core disposed substantially around said cable and said outer conductor; and
   a transceiver conductor coupled to said outer conductor and configured to communicate the data signals therethrough.

2. The device of claim 1, wherein said internal conductor includes a first end communicatively coupled to the power line at a first connection point on the power line and said internal conductor includes a second end communicatively coupled to the power line at a second connection point on the power line; and further comprising:
   a data impedance in communication with the power line between the first connection point and the second connection point.

3. The device of claim 2, wherein said internal conductor is communicatively coupled to a common mode choke.

4. The device of claim 3, wherein said first end of said internal conductor is communicatively coupled to a first connection lead and said second end of said internal conductor is communicatively coupled to a second connection lead, and wherein said first and second connection leads traverse through said common mode choke.

5. The device of claim 4, wherein said first connection lead is communicatively coupled to a first fuse and said second connection lead is communicatively coupled to a second fuse.

6. The device of claim 5, wherein said first fuse is disposed between said first end of said cable and said first connection lead and said second fuse is disposed between said second end of said cable and said second connection lead.

7. The device of claim 1, wherein said internal conductor, said insulator and said outer conductor form at least part of a first capacitor for communicating the data signals.

8. The device of claim 1, wherein said outer conductor is comprised of a metallic braid.

9. The device of claim 2, wherein said data impedance is comprised of at least one magnetically permeable toroid.

10. The device of claim 1, further comprising a transformer comprising a first and a second winding, and wherein said first winding has a first end in communication with said transceiver conductor.

11. The device of claim 10, wherein said second winding conductor is in communication with a data communication circuit comprised of a filter, an amplifier, and a modem.

12. The device of claim 1, further comprising a low frequency conductive path between said outer conductor and a ground potential.

13. The device of claim 1, wherein said internal conductor is communicatively coupled to a common mode choke.

14. The device of claim 13, further comprising a low frequency conductive path between said outer conductor and a ground potential.

15. The device of claim 1, wherein said device has a resonant frequency outside the band of frequencies used for communicating the data signals.

16. The device of claim 1, wherein said cable further comprises a semi-conductive jacket and further comprising a low frequency conductive path between said semi-conductive jacket and ground.

17. The device of claim 1, wherein said first end of said internal conductor of said cable is communicatively coupled to the power line via a first fuse and said second end of said internal conductor of said cable is communicatively coupled to the power line via a second fuse.

18. The device of claim 1, wherein said cable is the power line.

19. The device of claim 1, wherein said core forms part of a transformer and said internal conductor forms a first winding of said transformer.

20. The device of claim 19, wherein a second winding of said transformer is formed, at least in part, by said outer conductor.

21. A device for communicating data signals with a power line, the device comprising:
- a first conductive surface;
- a cable comprising a conductor and an insulator;
- wherein said insulator of said cable is disposed between said first conductive surface and said conductor;
- a magnetically permeable core disposed around said cable and said first conductive surface; and
- wherein said conductor and said insulator of said cable, said first conductive surface, and said core form a transformer for communicating the data signals.

22. The device of claim 21, wherein said first conductive surface is formed of a metallic braid.

23. The device of claim 21, wherein said cable further comprises a semi-conductive jacket and further comprising a low frequency conductive path between said semi-conductive jacket and a neutral conductor.

24. The device of claim 21, wherein said conductor is communicatively coupled to the power line through a fuse.

25. The device of claim 21, wherein said conductor includes a first end communicatively coupled to the power line at a first connection point on the power line and said conductor includes a second end communicatively coupled to the power line at a second connection point.

* * * * *

UNITED STATES PATENT AND TRADEMARK OFFICE
CERTIFICATE OF CORRECTION

PATENT NO.       : 7,046,124 B2
APPLICATION NO.  : 10/348164
DATED            : May 16, 2006
INVENTOR(S)      : Cope et al.

It is certified that error appears in the above-identified patent and that said Letters Patent is hereby corrected as shown below:

On page 3, in field (56), under "U.S. Patent Documents", in column 2, line 3, delete "B1" and insert -- B2 --, therefor.

On page 4, in field (56), under "Foreign Patent Documents", in column 1, line 19, delete "C2" and insert -- C1 --, therefor.

On page 4, in field (56), under "Foreign Patent Documents", in column 1, line 24, after "A2" insert -- , A3 --.

On page 4, in field (56), under "Foreign Patent Documents", in column 1, line 26, after "A2" insert -- , A3 --.

On page 4, in field (56), under "Foreign Patent Documents", in column 2, line 38, after "A2" insert -- , A3 --,.

On page 4, in field (56), under "Foreign Patent Documents", in column 2, line 49, after "A2" insert -- , A3 --.

On page 5, in field (56), under "Other Publications", in column 1, line 18, delete "LTD)." and insert -- LTD.). --, therefor.

On page 5, in field (56), under "Other Publications", in column 1, line 57, delete "Coporation" and insert -- Corporation --, therefor.

On page 5, in field (56), under "Other Publications", in column 1, line 61, delete "No" and insert -- No. --, therefor.

On page 5, in field (56), under "Other Publications", in column 2, line 2, delete "Ref" and insert -- Ref. --, therefor.

On page 5, in field (56), under "Other Publications", in column 2, line 4, delete "Commerical" and insert -- Commercial --, therefor.

On page 5, in field (56), under "Other Publications", in column 2, line 21, after "et al." insert -- , --.

UNITED STATES PATENT AND TRADEMARK OFFICE
CERTIFICATE OF CORRECTION

PATENT NO. : 7,046,124 B2
APPLICATION NO. : 10/348164
DATED : May 16, 2006
INVENTOR(S) : Cope et al.

It is certified that error appears in the above-identified patent and that said Letters Patent is hereby corrected as shown below:

On page 5, in field (56), under "Other Publications", in column 2, line 25, delete "servosytem" and insert -- servosystem --, therefor.

On page 5, in field (56), under "Other Publications", in column 2, line 36, after "Kilbourne, B." insert -- , --.

On page 6, in field (56), under "Other Publications", in column 2, line 39, delete "Technology" and insert -- Technological --, therefor.

On page 6, in field (56), under "Other Publications", in column 2, line 47, delete "Labaratory" and insert -- Laboratory --, therefor.

In column 1, line 38, after "voltage" delete "."

In column 2, line 9, delete "bidirectional" and insert -- bi-directional --, therefor.

In column 3, line 1, before "example" delete "a" and insert -- an --, therefor.

In column 3, line 7, after "schematic of" delete "an".

In column 8, line 19, delete "itself." and insert -- itself). --, therefor.

In column 10, line 44, delete "itself," and insert -- itself), --, therefor.

In column 11, line 23, delete "on" and insert -- of) --, therefor.

Signed and Sealed this

Nineteenth Day of September, 2006

JON W. DUDAS
*Director of the United States Patent and Trademark Office*